United States Patent [19]

Pomerantz et al.

[11] Patent Number: 4,961,154

[45] Date of Patent: Oct. 2, 1990

[54] THREE DIMENSIONAL MODELLING APPARATUS

[75] Inventors: Itzchak Pomerantz, Kefar Sava; Joseph Cohen-Sabban, Yahud; Avigdor Bieber, Raanana; Josef Kamir, Netanya; Mathew Katz, Haifa; Michael Nagler, Tel Aviv, all of Israel

[73] Assignee: Scitex Corporation Ltd., Herzlia Bet., Israel

[21] Appl. No.: 57,366

[22] Filed: Jun. 2, 1987

[30] Foreign Application Priority Data

Jun. 3, 1986 [IL] Israel ................................ 79007
Nov. 23, 1986 [IL] Israel ................................ 80728
May 14, 1987 [IL] Israel ................................ 82536

[51] Int. Cl.$^5$ .............................................. G06F 15/20
[52] U.S. Cl. ................................. 364/522; 425/174.4; 264/22; 264/255
[58] Field of Search ............... 364/522, 420, 468, 469, 364/473, 477; 425/174.4, 135, 140; 264/22, 40.1, 255, 58, 103, 241

[56] References Cited

U.S. PATENT DOCUMENTS

| 4,424,183 | 1/1984 | Nelson | 264/221 |
| 4,571,685 | 2/1986 | Kamashida | 364/468 |
| 4,573,354 | 3/1986 | Voorhees et al. | 73/432 R |
| 4,575,330 | 3/1986 | Hull | 425/174.4 |
| 4,628,466 | 12/1986 | Tymes | 364/521 |
| 4,694,404 | 9/1987 | Meagher | 364/518 |
| 4,700,317 | 10/1987 | Watanabe et al. | 364/488 |
| 4,704,698 | 11/1987 | Reiniger | 364/523 |
| 4,707,787 | 11/1987 | Savit et al. | 364/420 |
| 4,736,306 | 4/1988 | Christensen et al. | 364/513 |
| 4,739,495 | 4/1988 | Levine | 364/571 |
| 4,752,498 | 6/1988 | Fudim | 264/22 |
| 4,780,260 | 10/1988 | Yoshida et al. | 264/255 |
| 4,791,581 | 12/1988 | Ohba | 364/521 |
| 4,814,119 | 3/1989 | Scholz | 264/22 |
| 4,844,144 | 7/1989 | Murphy et al. | 164/35 |
| 4,863,538 | 9/1989 | Deckard | 264/58 |

FOREIGN PATENT DOCUMENTS 0171069 8/1985 European Pat. Off.
0168179 12/1985 European Pat. Off.
1797599 10/1973 Fed. Rep. of Germany.
2567668 7/1984 France.
243646 1/1947 Switzerland.
1243044 7/1968 United Kingdom.
1472978 4/1974 United Kingdom.
1582199 7/1977 United Kingdom.
2040804 9/1980 United Kingdom ................... 264/22
8101474 11/1980 World Int. Prop. O..

OTHER PUBLICATIONS

J. of Appl. Photographic Engineering, vol. 8, No. 4, Aug. 1982, pp. 185-188, A. J. Herbert—Solid Object Generation.
Chemical Abstracts, vol. 91, No. 24, Dec. 1979, p. 609, A. Aviram.
Hideo Kodama—Automatic Method for Fabricating 1 3-Dimensional Plastic Model eith Photo-Hardening Polymer, Rev. Sci. Instrum., 52)11=, Nov. 1981, pp. 1770-1773.
John K. Krouse—High Technology, Engineering Without Paper, Mar. 1986, pp. 38-46.
Catalog of Fischer Educational Materials, Springfield, N.J., USA, Item 865466, Jun. 1987.
Graphic Input Devices for CAD/CAM by Thomas A. Nobbe, Machine Design, Feb. 21, 1985, pp. 109-111.
V. D. McGinnis, Org. Coatings Appl. Polym. Sci., 48, 231-234, (Mar. 1983).
J. G. Kloosterber et al., Polym Preprints, 26 [2], 351, 352, (Sep. 1985).

Primary Examiner—Gary V. Harkcom
Assistant Examiner—Phu K. Nguyen
Attorney, Agent, or Firm—Abelman Frayne Rezac & Schwab

[57] ABSTRACT

Three dimensional mapping and modelling apparatus comprising apparatus for providing coordinate information with respect to a three-dimensional element, workstation apparatus arranged to receive the coordinate information from the providing apparatus and to permit manipulation of the coordinate information, and apparatus responsive to manipulated coordinate information for automatically providing a three-dimensional model of a desired three-dimensional element.

25 Claims, 33 Drawing Sheets

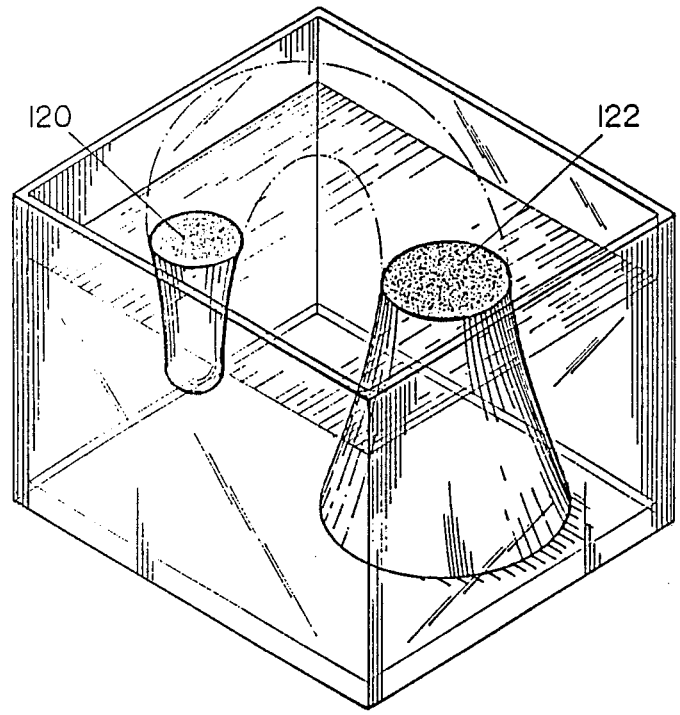
FIG. 8A  INTERIM LAYER:— TWO ISOLATED PARTS
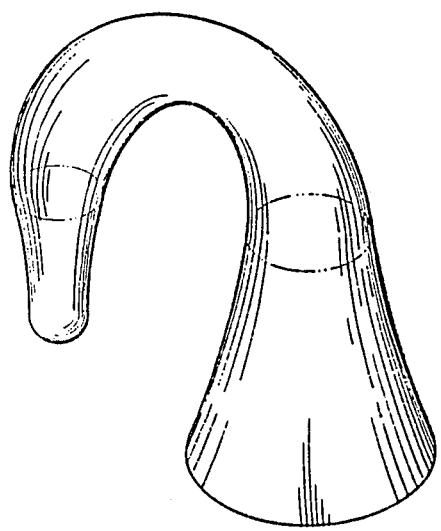
FIG. 8B  FINAL OBJECT:— ONE SOLID PART

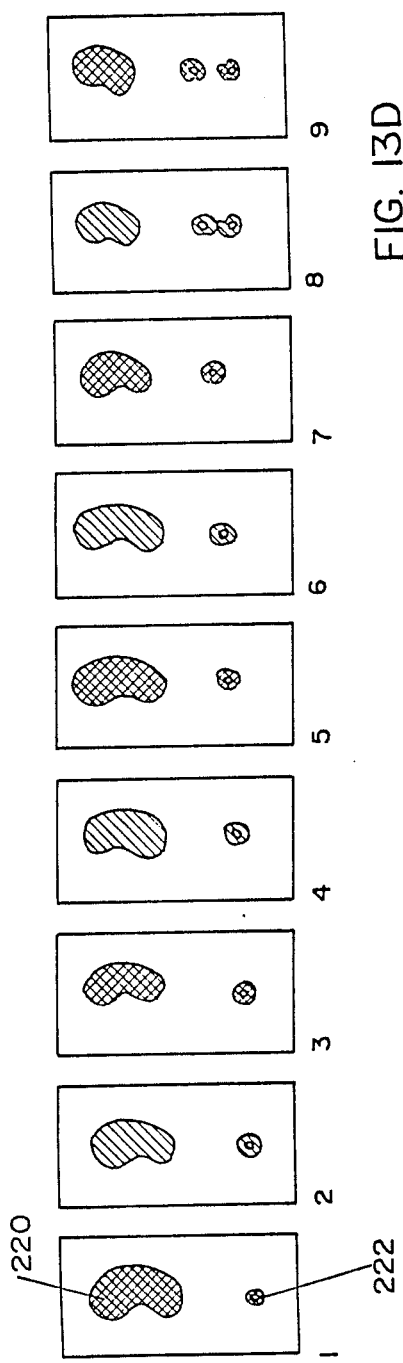
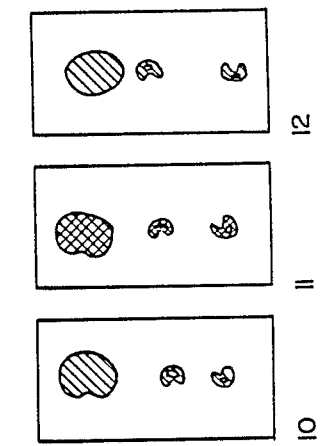
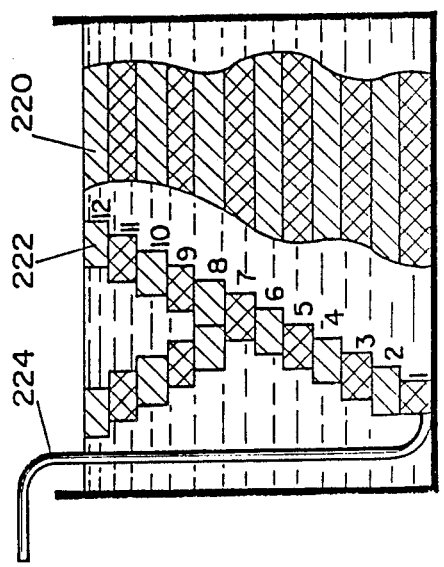
FIG. 13D
FIG. 13C

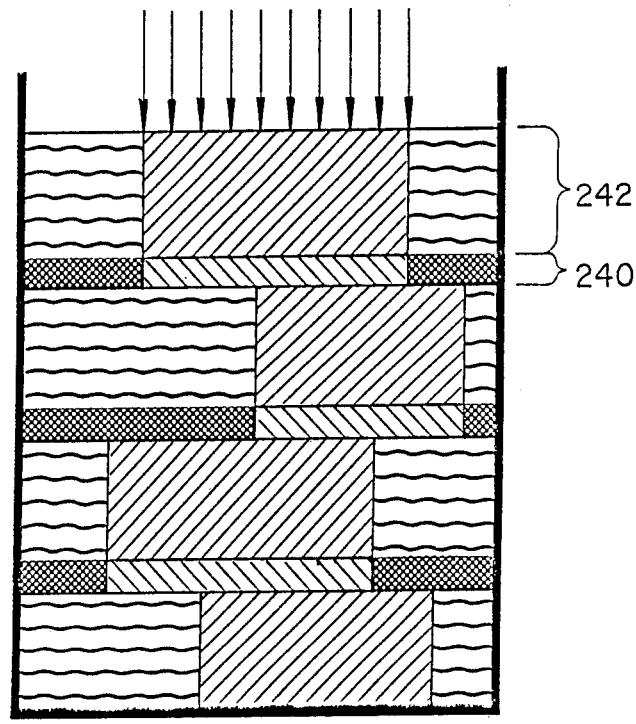
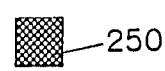 —250   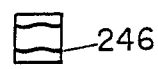 —246
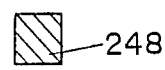 —248   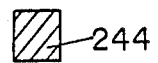 —244
FIG. 14

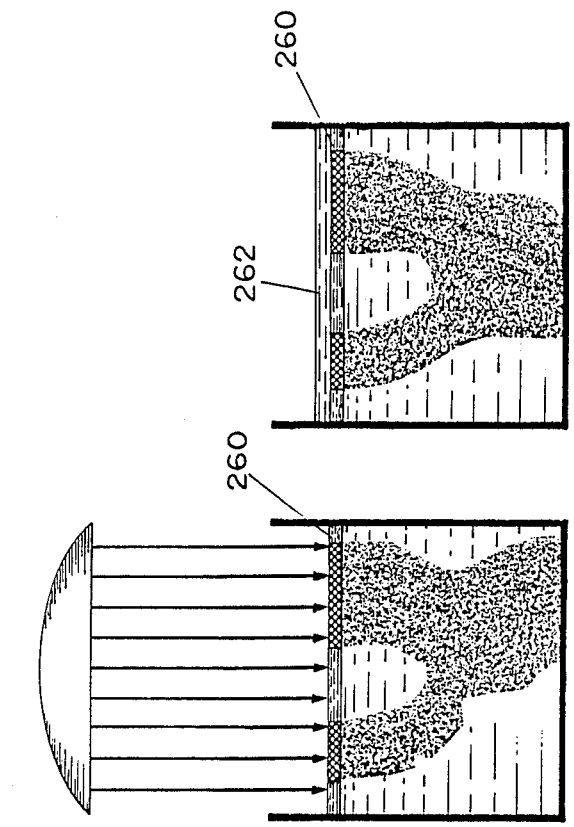
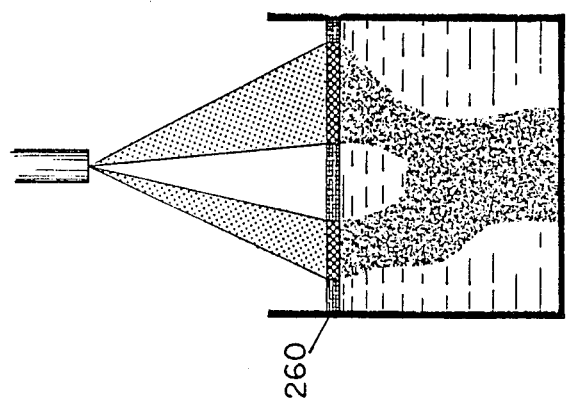
FIG. 15A  FIG. 15B  FIG. 15C

THREE DIMENSIONAL MODELLING APPARATUS

FIELD OF THE INVENTION

The present invention relates to apparatus for three-dimensional modelling generally and more particularly to apparatus for three-dimensional modelling in response to a computer output.

BACKGROUND OF THE INVENTION

Various systems for three dimensional modelling have been proposed. There is described in U.S. Pat. No. 4,575,330 to Hull, apparatus for production of three-dimensional objects by stereolithography. The system described therein is intended to produce a three-dimensional object from a fluid medium capable of solidification when subjected to prescribed synergistic stimulation and comprises apparatus for drawing upon and forming successive cross-sectional laminae of the object at a two-dimensional interface and apparatus for moving the cross-sections as they are formed and building up the object in step wise fashion, whereby a three-dimensional object is extracted from a substantially two-dimensional surface.

An earlier publication by Hideo Kodama entitled "Automatic method for fabricating a three-dimensional plastic model with photo-hardening polymer", Rev. Sci Instrum. 52 (11) November, 1981, pp. 1770–1773 describes many of the features appearing in the Hull patent as well as additional features.

An article by Alan J. Herbert entitled "Solid Object Generation" in Journal of Appled Photographic Engineering 8: 185–188 (1982) describes the design of apparatus for producing a replica of a solid object using a photopolymer.

FIG. 5 of the Hull Patent and FIGS. 1a and 1b of the Kodama article illustrate layer by layer buildup of a model through radiation applied to a solidifiable liquid through a mask using a "contact print" technique. Accordingly, the pattern mask for each layer must be in a 1:1 scale relationship with the object to be generated and must be located extremely close to it.

A number of difficulties are involved in the use of a contact print technique due to the required 1:1 scale. If a complex object having a typical size of up to 10 inches on each side is contemplated and resolution of 100 microns is desired, approximately 2500 masks will be required, covering an area of over 150 sq. meters. An extremely fast mechanism for moving and positioning the masks and the use of non-standard film of a given size for a given scale output would be required.

The required proximity of the mask to the object in contact print exposure is not believed to be desirable in an industrial environment because of anticipated contact between the mask and the solidifiable liquid due to vibrations in the liquid during positioning and movement of the masks and due to spurious impacts.

Neither Kodama nor Hull provides apparatus for accurate positioning of the mask and accurate registration of masks for different layers. The positioning error must not exceed the desired resolution, typically 100 microns.

Both Kodama and the Hull patent employ an arrangement whereby the object is built up onto a base which lies in a container of solidifiable liquid and moves with respect thereto. Such an arrangement involves placing a base displacement mechanism in the container and in contact with the solidifiable liquid. Due to the high viscosity and glue-like nature of such liquids, it is believed to be impractical to operate such a system, particularly when it is desired to change materials in order to vary the mechanical properties or color of the object being generated.

Furthermore, should excessive radiation be applied to the liquid, the entire volume might solidify, thus encasing the support mechanism therein.

Another difficulty with the apparatus for support of the model in the prior art exemplified by Kodama and Hull lies in maintenance of the stability of the solidifiable liquid. Both Hull and Kodama move the model in the liquid, causing disturbances in the liquid and thus requiring time for the liquid to settle after each such displacement. Hull describes movement of the light source but not as a substitute for the displacement of the object relative to the liquid.

The technique of supplying solidifiable liquid into the container in the course of building up the model is not specifically described in either Kodama or Hull. Herbert shows at FIG. 3, a tap which releases solidifiable liquid well above the liquid surface.

Definition of the bottom limit of solidification for a given layer is achieved in the Hull and Kodoma references by precise control of irradiation energy levels. Due to the fact that energy intensity decreases exponentially with depth within the liquid, this technique does not provide a sharp definition in layer thickness, as noted by Hull on pages 9 and 10, referring to FIG. 4. Hull suggests solving the problem of bottom limit definition by using an upwardly facing radiation technique which is not applicable to many geometrical configurations.

The prior art exemplified by the Kodama and Hull references does not provide teaching of how to model various geometries which involve difficulties, for example a closed internal cavity, such as a hollow ball, isolated parts, such as a linked chain, and vertically concave shapes, such as a simple water tap. The identification of situations which require the generation of support structures and the automatic generation of such structures are not suggested or obvious from the prior art.

An additional difficulty involved in prior art modelling techniques of the type exemplified by the Kodama and Hull references, but which is not explicitly considered by either is shrinkage of the solidifiable liquid during solidification. Normal shrinkage for most of the available monomers employed in the prior art is about 8% in volume and 2% in each linear dimension. This shrinkage can affect the dimensional accuracy of the three dimensional model in the following principal ways: two-dimensional linear scale changes, two-dimensional non-linear distortions due to internal stresses with each individual layer as it solidifies and three-dimensional distortions due to stresses arising from stresses in the overall model during a final curing step.

The Hull technique suggests the use of direct laser writing in a vector mode, which requires extreme uniform writing speed in order to maintain a constant energy level and produce a uniform layer thickness.

SUMMARY OF THE INVENTION

The present invention seeks to provide three-dimensional mapping and modelling apparatus, which is fast, relatively inexpensive and is suitable for use in an industrial environment.

There is thus provided in accordance with a preferred embodiment of the present invention three dimensional mapping and modelling apparatus comprising apparatus for providing coordinate information with respect to a three-dimensional element, workstation apparatus arranged to receive the coordinate information from the providing apparatus and to permit manipulation of the coordinate information, and apparatus responsive to manipulated coordinate information for automatically providing a three-dimensional model of a desired three-dimensional element.

In accordance with a preferred embodiment of the present invention, the apparatus for providing a three-dimensional model comprises optical apparatus having optical power for irradiating a layer of a solidifiable liquid. An example of suitable apparatus for this purpose is a conventional slide projector operating at an appropriate wavelength and employing a multi-lens optical system.

Additionally in accordance with a preferred embodiment of the present invention the apparatus for providing a three-dimensional model includes apparatus for accurate positioning and registration of a plurality of pattern masks including a closed loop position monitoring system for governing positioning and registration.

Additionally in accordance with a preferred embodiment of the invention, there is provided means for generating pattern masks by photographic techniques. According to one embodiment of the invention, the mask is a conventional commercially available photographic film generated by a conventional laser plotter such a Raystar plotter manufactured by Scitex Corporation Ltd. of Herzlia, Israel.

Further in accordance with an alternative embodiment of the invention, there is provided means for generating pattern masks by electrophotographic techniques. According to one embodiment of the invention, the mask is generated by the deposition of toner on a glass plate in a desired pattern. The pattern is generated by exposing a charged electrophotographic drum using a laser beam in a line by line writing mode. The mask can then be erased, when desired, and another mask generated in its place.

According to a further embodiment of the invention, exposure through the erasable mask may be line-by-line exposure using an electro-optic shutter, such as a light switching array, or frame-by-frame exposure using a planar array such as an LCD array.

Further in accordance with a preferred embodiment of the present invention, the apparatus for providing a three-dimensional model comprises a disposable container for solidifiable liquid and apparatus for providing relative displacement between the apparatus for irradiating and the support base for the object being built up which is maintained entirely out of contact with the liquid.

According to one embodiment of the invention, the apparatus for providing relative displacement comprises means for moving the container and the support base together relative to the apparatus for irradiating which is fixed.

According to an alternative embodiment of the invention, the apparatus for providing relative displacement comprises means for moving the apparatus for irradiating relative to the container and support base which are fixed. This may be achieved either by moving the source of radiation or by moving optical elements associated therewith which define the image plane.

Additionally in accordance with a preferred embodiment of the present invention the apparatus for providing relative displacement in accordance with the invention is operated continuously rather than in step-wise movement.

Additionally in accordance with a preferred embodiment of the present invention apparatus is provided for pre-processing of given geometries in order to enable them to be successfully modelled.

Further in accordance with a preferred embodiment of the present invention, the apparatus for providing a three-dimensional model comprises apparatus for defining a stable layer of solidifiable liquid in a desired plane.

In accordance with one embodiment of the invention, the apparatus for defining comprises apparatus for defining a volume of non-solidifiable support material which may be a non-solidifiable liquid or a liquid that solidifies other than under the conditions at which the solidifiable liquid solidifies. The apparatus for defining also comprises apparatus for defining a layer of solidifiable liquid over the support material.

Additionally in accordance with an embodiment of the invention, the thickness of the solidified layer can be controlled by providing a radiation opaque or reflective layer below every solidifiable layer or by chemically neutralizing the solidifiable properties of the solidifiable layer after initial radiation application.

Further in accordance with a preferred embodiment of the present invention, the solidfiable liquid is formulated to have relatively small amounts of shrinkage.

According to a preferred embodiment of the invention, the active monomer in the solidifiable liquid, which has a given shrinkage coefficient is mixed with another monomer which has a given expansion coefficient in order to provide a mixture which has a zero or near zero shrinkage coefficient.

According to an alternative embodiment of the present invention, radiation of the liquid layer is carried out such that as shrinkage occurs, additional solidifiable liquid moves into place to take up the shrinkage and is solidified.

According to a further alternative embodiment of the invention, radiation of the liquid layer may be patterned to restrict shrinkage at any given time to localized areas, whereby the shrinkage can be made up during solidification of adjacent areas.

Additionally in accordance with a preferred embodiment of the invention, the solidifiable material may include radiation transparent particles in order to reduce the effective volume of curing material for a given volume of solidifiable liquid and therefore reduce the energy needed to solidify that given volume and reduce the shrinkage coefficient of the solidifiable material. In this way, the photosensitivity of the solidifiable liquid is increased.

Additionally in accordance with an embodiment of the present invention there is provided automatic modelling apparatus comprising apparatus for generating a solid object of given configuration by rolling selectably dimensionable web material in a generally cylindrical configuration and apparatus for selectably dimensioning the web material. The layer of web material may comprise a photoresist film, or a thin layer of monomer paste. The selectable dimensioning may be achieved, for example, by scanning with a modulated laser beam, radiation through a linear shutter array or illuminating through a pre-prepared film or through an electrophotographic plate or film.

According to a preferred embodiment of the present invention, the apparatus for producing a three-dimensional model comprises a three dimensional zooming capability, providing enlarged or reduced size models from the same computer file, while maintaining a desired relative resolution along each axis.

BRIEF DESCRIPTION OF THE DRAWINGS

The present invention will be understood and appreciated more fully from the following detailed description, taken in conjunction with the drawings in which:

FIGS. 8A and 8B are illustrations of initially isolated parts of an object during formation thereof in accordance with the present invention and of the finished object respectively;

FIGS. 13A, 13B, 13C, 13D, 13E and 13F illustrate six alternative embodiments of a solidifiable liquid feeding arrangement useful in the arrangement of FIG. 12;

FIG. 14 is a sectional illustration of multi-layer exposure of a solidifiable liquid employing intermediate layers of a blocking material to limit the depth of solidification of the solidifiable liquid;

FIGS. 15A, 15B and 15C illustrate three steps in a chemical inhibition technique in limiting the depth of solidification of the solidifiable liquid;

DETAILED DESCRIPTION OF THE INVENTION

Figure 1:
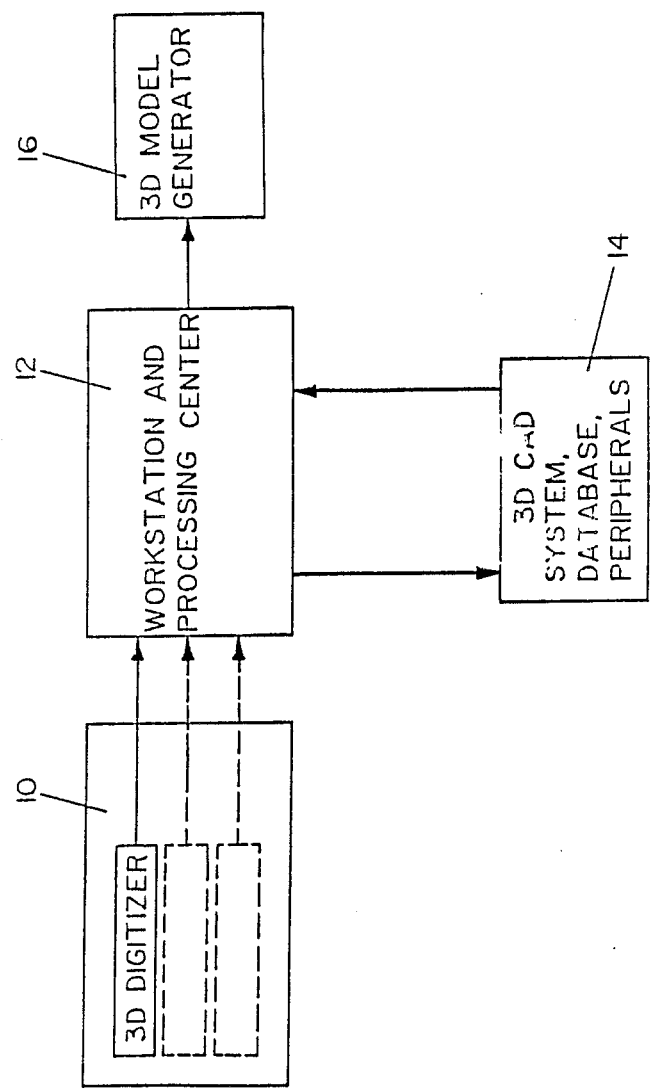
FIG. 1 is a block diagram illustration of a three-dimensional mapping and modelling system constructed and operative in accordance with a preferred embodiment of the present invention.

Reference is now made to FIG. 1, which illustrates, in general block diagram form, a three-dimensional mapping and modelling system constructed and operative in accordance with a preferred embodiment of the present invention.

The system typically comprises configuration information input apparatus 10, such as a conventional 3-D digitizer. An example of such a digitizer is a 3SPACE Digitizer manufactured and sold by McDonnell Douglas Electronics Company. Other suitable types of information input apparatus, such as those described hereinabove in the Background of the Invention, may alternatively be employed. Additional input sources may be three-dimensional computer aided design (CAD) files, and interactively sculptured objects generated at a workstation.

Further in accordance with a preferred embodiment of the invention, the output of a Computerized Tomography Scanner, such as a General Electric GE8800 CT Scanner, in the form of a multi-slice sequential data file, may be employed by the system to generate a physical replica of a scanned object. Such a replica can be useful in diagnosis and surgery planning.

A workstation and processing center 12 receives configuration information inputs from apparatus 10 and provides a viewable display of such information, preferably in raster format, to an operator, and enables the operator to edit such information or to generate such information at the workstation.

The principal functions performed by workstation and processing center 12 are as follows:

a. VOXELIZATION

Voxelization is an automatic function that converts the solid model taken from a CAD (Computer Aided Design) system into a compact voxel enumeration format, such as OCTREE, which inherently allows for variable resolution spatial data treatment. In practice, this means converting data from three-dimensional vector presentation into a collection of voxels located at specific locations in space.

b. VOXEL EDITING

Voxel editing is a working tool in the hands of the operator, enabling manipulation of the shape of an object presented on a screen. This is done by offering the operator direct access to the voxels, allowing him to add, delete or change the values of voxels by means of a suitable control device, such as a lightpen, ball, joystick, etc. The principal features realized by this function are drawing, line choice, cross-section determination, space fill, trimming, copying and mirror imaging.

c. FREE HAND SCULPTURING

In contrast to the voxel editing function described in the preceding paragraph, which is based on a CAD file converted into voxels, this function permits creation of a model "from scratch", i.e. without using input apparatus 10. The operator creates the model by using sculpturing techniques based either on building up or subtracting material.

In addition to free-hand sculpting, the operator will have at his disposal simulated machining tools, that will enable him to shape the object. The software tools employed by the operator include tool definition (drill, lathe, mill, nozzle, etc.), a build up/subtract option, etc.

d. CONVERSION INTO SOLID MODELS

This function is the reverse process of the voxelization process. A file describing a body as a group of voxels in space is converted into three-dimensional constructive solid geometry (CSG) based on voxels as primitive cubes in a selected CAD format. This enables a model to be created on the present apparatus for further CAD analysis and operations to be carried out on an associated CAD system on the same model.

A plurality of model creation operands are available to the operator, prior to generating the physical model. These include scale setting, resolution setting, physical grid creation, supporting rib creation (where needed to support an object at a desired location in space), nesting (to provide most efficient use of the modelling medium), and definition of drainage conduits (where needed).

Workstation and processing center 12 interfaces with conventional 3-D computer aided design apparatus 14 and software such as GEOMOD of General Electric/Calma, CADS of Computervision, UNIGRAPHICS of McAuto, MEDUSA of Prime Computer or CIS. A description and listing of CAD programs appears in "Engineering without Paper" by John K. Krouse, *High Technology*, March 1986, at pages 38–46. Workstation and processing center 12 also provides an output to three-dimensional modelling generator 16.

Figure 2A:
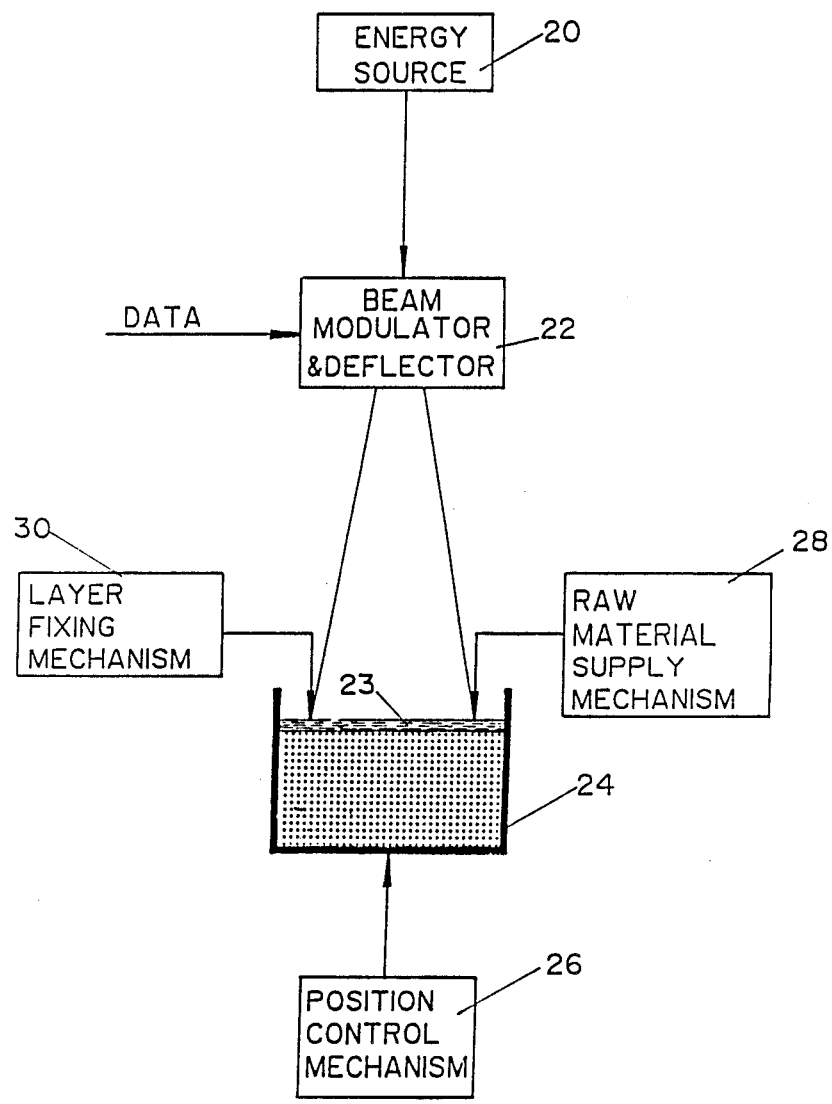
FIGS. 2A and 2B are generalized block diagram illustrations of two alternative embodiments of a three dimensional modelling system constructed and operative in accordance with a preferred embodiment of the present invention.
Figure 2B:
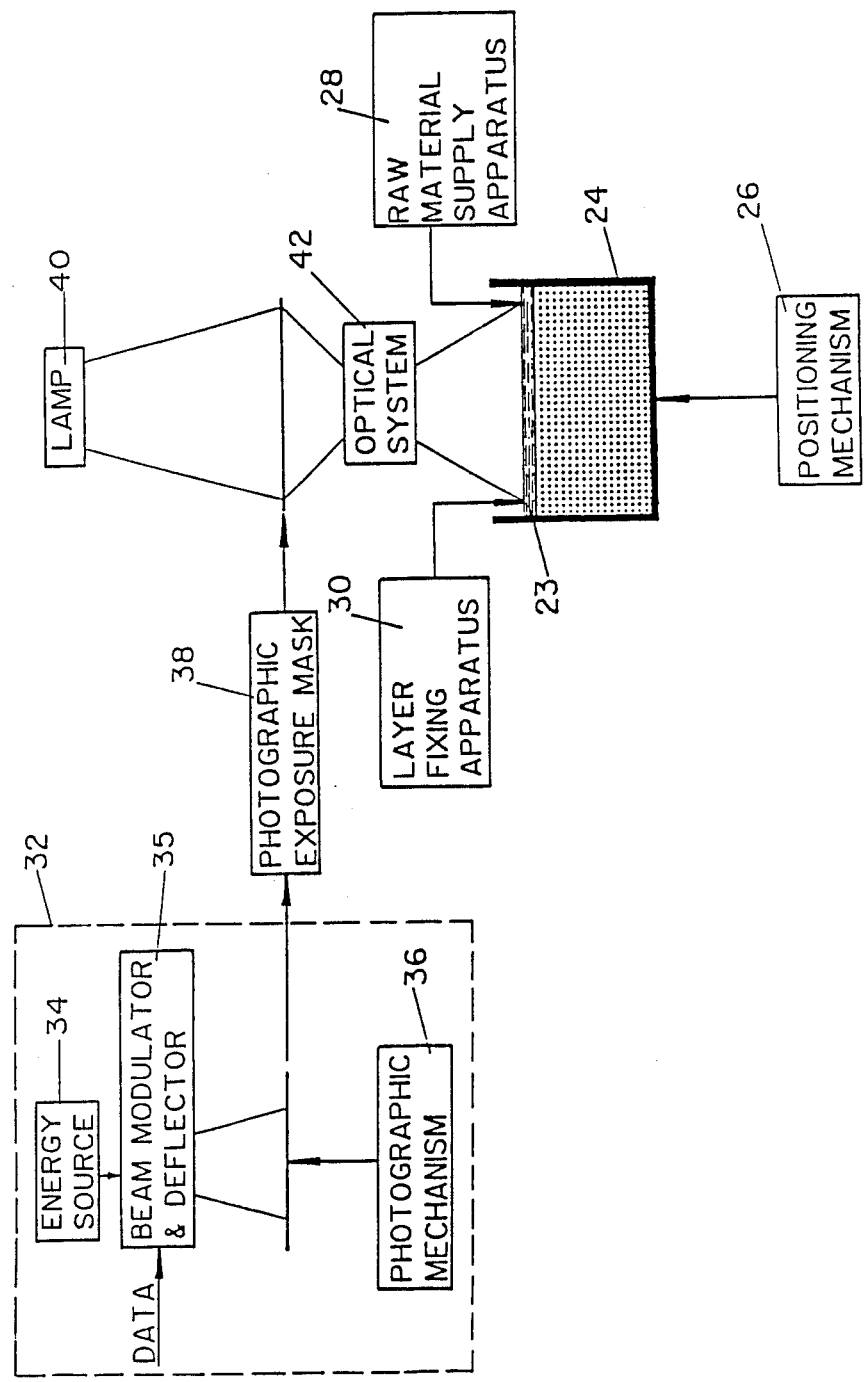

Two alternative preferred embodiments of three-dimensional modelling generator 16 are illustrated generally in FIGS. 2A and 2B. The embodiment of FIG. 2A provides direct exposure of a solidifiable liquid, while the embodiment of FIG. 2B provides indirect exposure thereof.

Considering first the embodiment of FIG. 2A, there is seen an energy source 20, such as a laser or a strong arc lamp having a short gap, which provides a beam of radiation via a beam modulator 21 and deflector 22, which receives a data input from a computer or storage medium.

The modulated and deflected beam impinges on a layer of a solidifiable liquid, lying in a solidification plane 23. The solidifiable liquid may be any suitable radiation polymerizable material which is commonly used in the coating and printing industries. Examples of such materials are as follows: 6180 of Vitralit, of Zurich, Switzerland, ELC 4480 of Electro-lite Corporation of Danbury, Conn., U.S.A., UVE-1014 of General Electric Company of Schenectady, N.Y., U.S.A., Irgacure 184 of Ciba Geigy of Switzerland.

The solidifiable liquid is located in a container 24, which is typically supported on a container positioning mechanism 26 and is associated with raw material supply apparatus 28 and layer fixing apparatus 30.

The data received by the beam deflector 22 may be of any suitable form and is typically in raster form, vector form, or a combination of both. When raster data is received, the beam is deflected across the solidification plane so that it periodically sweeps the entire area of the layer in a dense and regular pattern, typically an arrangement of dense parallel lines. This pattern may be realized by deflecting the beam in a fast saw-tooth pattern in a first dimension, and in a slow saw-tooth pattern in a perpendicular dimension. As the beam sweeps the solidification plane, the data from the computer instructs the modulator to switch the radiated energy on and off, so that whenever the beam is directed to a location at which solidification is desired, the radiated energy is provided and whenever the beam is directed to a location at which solidification is not desired, the radiated energy is not provided. A suitable beam deflector driver for use with raster data is a scanning mirror, such as model S-225-015-XLOB5 available from Lincoln Laser Co. of Phoenix, Ariz., U.S.A.

When vector data is received, the beam is deflected to follow the desired contours of the solid parts in the solidification plane and to fill in the area delimited thereby. A suitable beam deflector driver for use with vector data may be found in galvanometric recorders manufactured by Honeywell, Test Instrument Division, Denver, Colo., U.S.A.

Considering now the indirect exposure embodiment of FIG. 2B, there is seen apparatus for generating photographic masks 32, typically including an energy source 34, such as a small visible light laser source, such as a laser diode, a beam deflector and modulator 35 arranged to receive a data output from a computer or a storage medium, and a photographic mechanism 36 which is operative to produce a photographic exposure mask 38 for each layer or group of layers of solidifiable liquid to be exposed, as appropriate.

The photographic exposure mask 38 is then exposed using what may be a conventional projection system, such as a conventional slide projector, including a lamp 40 and an optical system 42 having optical powr. Similarly to the embodiment of FIG. 2A, here the image of the mask is focused onto a solidification plane 23 so as to selectably solidify a layer of solidifiable liquid. The solidifiable liquid is located in a container 24, which is typically supported on a container positioning mechanism 26 and is associated with raw material supply apparatus 28 and layer fixing apparatus 30.

Figure 3:
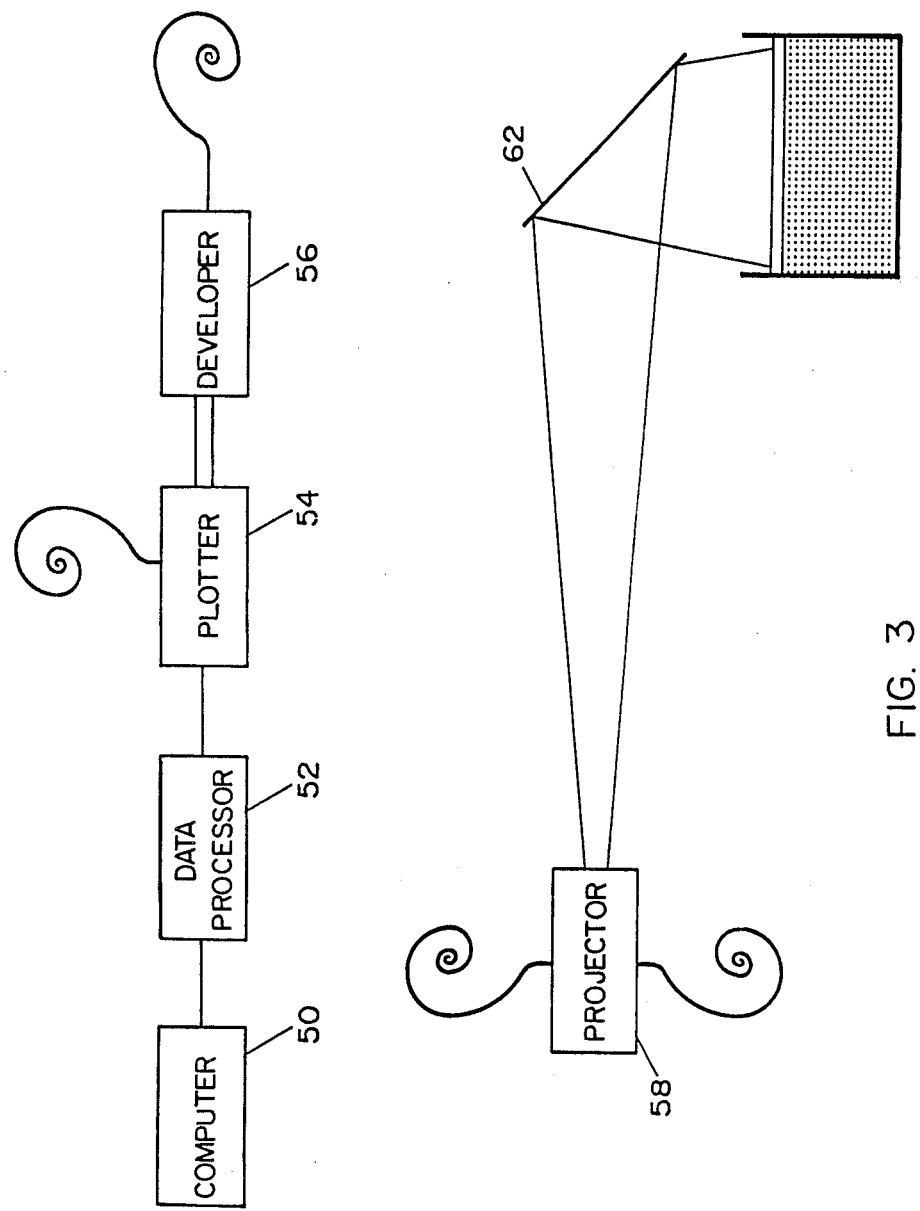
FIG. 3 is a block diagram illustration of a portion of an embodiment of the indirect exposure modelling system of FIG. 2B.

Reference is now made to FIG. 3, which illustrates, in block diagram form, an indirect exposure system corresponding to part of the system illustrated in FIG. 2B. Here it is seen that configuration information from a computer 50, preferably in a conventional format common in computer aided design systems, is typically provided to a data processor 52, such as can be found in any raster display processor, such as the Quantum I system of Scitex Corporation Ltd. of Herzlia, Israel, which provides a "plot function". The raster display converts the information to raster or vector data that describes the solidification pattern for each given layer. The output of the data processor 52 is supplied to a plotter 54, such as a microfiche plotter model APS 51, available from Autologic, Inc. of Newbury Park, Calif., which produces a photographic film with the desired solidification pattern for each layer. The plotter 54 is associated with an on-line or off-line developer 56. Film prepared by plotter 54 and developed by developer 56 is then supplied in an on-line or off-line manner, tyically off-line, to a projecting device 58, having a short gap mercury lamp such as a Porta-Cure 100 available from American Ultraviolet Co. of Chatham, N.J. and an optical system such as a filmstrip projector, for example Item 865466 appearing in the Catalog of Fischer Educational Materials of Springfield, N.J., U.S.A., which projects the image of the solidification pattern onto the solidification plane either directly or via a folding mirror 62.

The above described arrangement avoids the need for contact printing and the disadvantages associated therewith. It enables the size of the image projected onto the solidification plane to be varied by simply varying the location of the projecting lens relative to the film.

The above-described arrangement is an off-line arrangement and thus frees the CAD unit and computer 50 from being tied to slow operation of the solidification apparatus. It obviates the need for strong UV lasers which are expensive to purchase, install and maintain. It provides a high resolution mask with greater ease than can be achieved by direct printing.

Figure 4A:
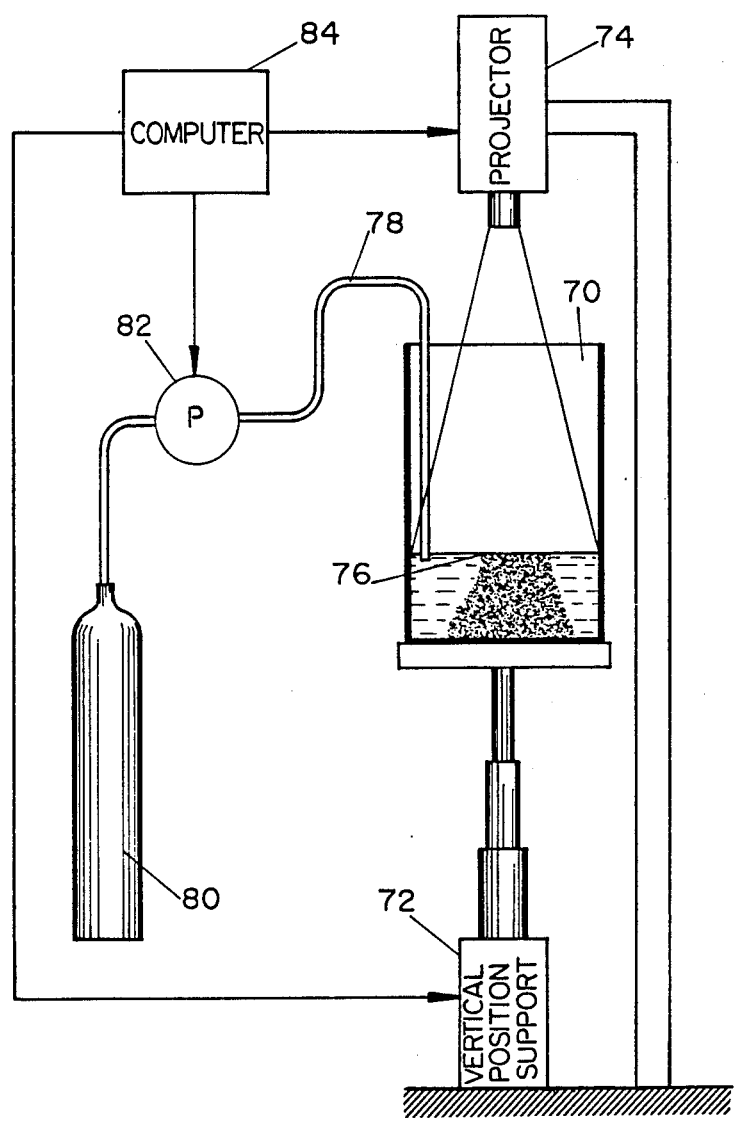
FIGS. 4A and 4B are pictorial illustrations of two operative orientations of a solidifiable liquid feeding, containing and positioning arrangement useful in the invention wherein the container is movable and the solidification plane remains static.
Figure 4B:
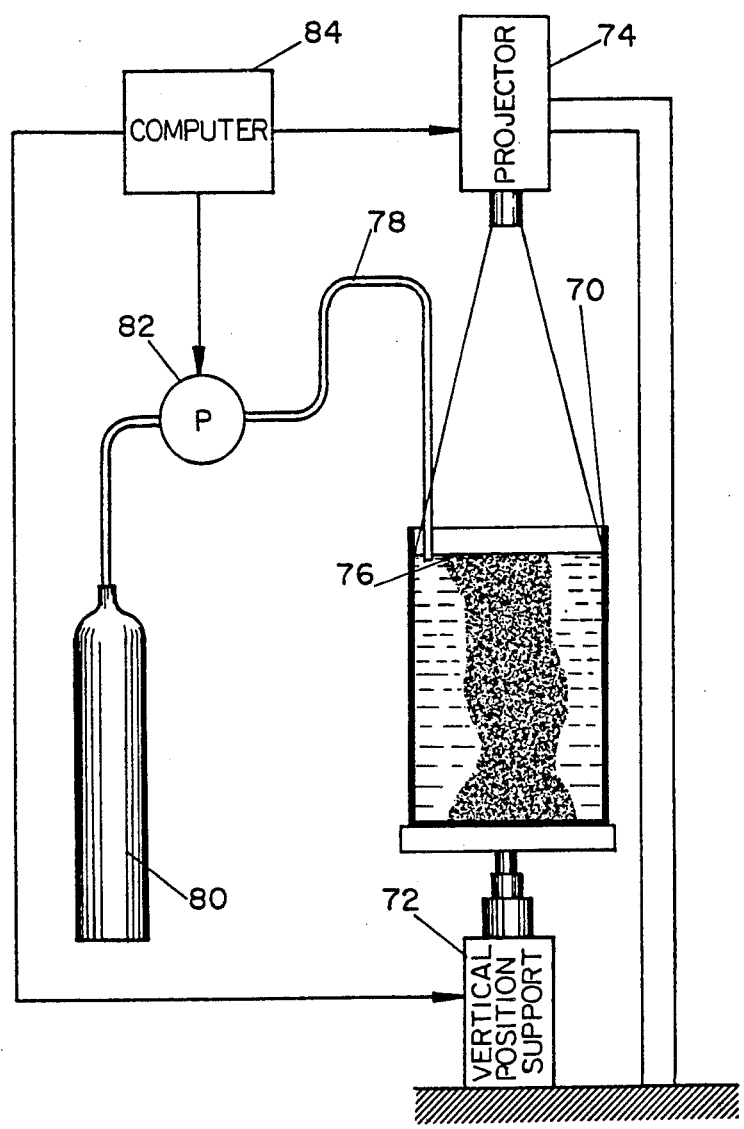

Reference is now made to FIGS. 4A and 4B which illustrate two operative orientations of a solidifiable liquid feeding, containing and positioning arrangement useful in the invention wherein the container is movable and the solidification plane remains static.

In the embodiment of FIGS. 4A and 4B, a model building container 70 is arranged to be supported on a selectable vertical position support 72, such as a motor driven stage, such as a model ATS200 available from Aeroteck Ltd. of Newbury, England. A fixed projector 74 is arranged to project optically a solidification pattern in a fixed solidification plane 76. According to a preferred embodiment of the invention, a solidifiable material feed line 78 is arranged to terminate at a fixed location located at a fixed relatively small distance, (such as 0.5 mm) above or below the solidification plane 76.

Solidifiable material is supplied from a reservoir 80 via a pump 82, such as a digitally controlled pump, through feed line 78 to a location just above or below the solidification plane, so as to minimize disturbances to the liquid at the solidification plane due to feeding of solidifiable liquid to the container 70. A computer 84 controls and coordinates the operation of projector 74 and selectable vertical position support 72 and the operation of pump 82, which is typically a digitally controlled pump, such as a digitally driven dispenser manufactured by Masterflex, and which is described on page 572 of the 1985–1986 catalog of Cole-Parmer, of Chicago, Ill., U.S.A.

It may be seen from a consideration of FIGS. 4A and 4B that as the solidifiable object is built up, support 72 is lowered such that the solidification plane 76, which is fixed, lies at successively higher locations with respect to the container 70.

It is a particular feature of the embodiment of FIGS. 4A and 4B, that with the exception of the end of the feed line 78 and the container 70, no other portion of the system comes into physical contact with the solidifiable liquid, thus minimizing required cleaning, as both the container and the feed tube end may be disposable.

In accordance with a preferred embodiment of the present invention, pre-processing of configuration information is provided in order to enable complex or hollow objects to be formed by the technique of the present invention.

As a preliminary step for such pre-processing, configuration data for the modelling is converted from a CAD format to a 3-dimensional raster format in which the desired object is located within a three dimensional box, which is divided into a multiplicity of cubic unit volumes whose dimensions are equal to the desired spatial resolution, each such unit volume representing a voxel.

Each voxel is identified by three indices x, y and z and is assigned a binary value of 1 if it lies within the solid object to be modelled and a value of 0 otherwise.

It may be appreciated that the solid mode is fully described to the predetermined resolution limits by the binary value of all of the voxels.

In accordance with an embodiment of the invention, conversion of data from a CAD format to a raster format may be achieved by requiring the CAD system to generate a sequence of parallel sections of the object, each spaced from the other by the desired resolution. Data for each such section is then converted into two dimensional raster format having the desired resolution. A stack of such sections defines a three dimensional matrix.

Sequential sectioning of three-dimensional objects is a conventional capability in CAD systems and is known as a "topographical map function" in the MEDUSA system available from Prime Computer, of Natick, Mass. Two dimensional conversion of CAD data into raster form is entirely conventional and is commercially available in the Quantum 1 system manufactured by Scitex Corporation Ltd. of Herzlia, Israel, and is know as the "plot" function in that system.

Figure 5:
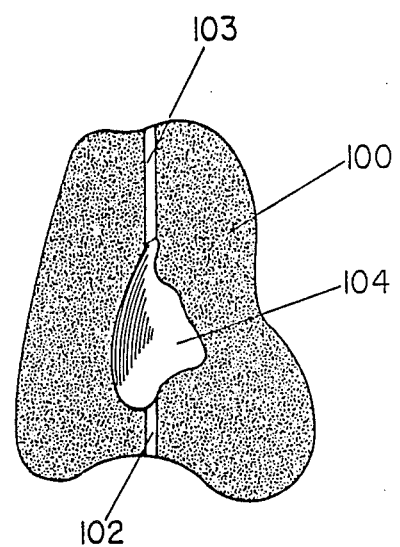
FIG. 5 is a cross sectional illustration of a hollow object formed in accordance with the present invention and uncluding liquid drain conduits formed therein.

Referring now to FIG. 5, there is seen a hollow object 100. In accordance with the present invention, a drainage conduit 102 and an air conduit 103 are formed in the model as it is built up in order to permit drainage of non-solidified solidifiable liquid from the hollow region 104. The formation of such drainage conduits can take place in accordance with the following sequence of operative steps:

1. START EXAMINING A LAYER (THE EXAMINED LAYER) AT THE TOP OF THE THREE DIMENSIONAL MATRIX AND BEGIN TO CHECK EACH LAYER, LAYER BY LAYER;
2. CHECK WHETHER THE EXAMINED LAYER OF THE MATRIX IS ALSO THE LOWEST LAYER, IF YES, GO TO STEP 9;
3. IDENTIFY THE AREAS IN THE EXAMINED LAYER HAVING A ZERO BINARY

VALUE (THIS MAY BE ACHIEVED USING AN ALGORITHM AVAILABLE IN THE "CLAR" FUNCTION IN THE R-280 SYSTEM OF SCITEX CORPORATION LTD.);
4. CHECK WHETHER THE ZERO AREAS IN THE EXAMINED LAYER OVERLAP ANY ZERO AREAS IN THE PRECEDING LAYER THAT WAS CHECKED;
5. IF NO, DECLARE A NEW CAVITY AND ASSIGN THE NON OVERLAP ZERO AREAS THERETO AND PROCEED TO STEP 2 FOR A SUBSEQUENT LAYER LYING BELOW THE PREVIOUS EXAMINED LAYER;
6. IF YES, AND IF THE ZERO AREA IN THE EXAMINED LAYER OVERLAPS EXACTLY ONE ZERO AREA IN THE PREVIOUS EXAMINED LAYER, ASSIGN IT TO THE SAME CAVITY AS THAT TO WHICH THAT ZERO AREA IN THE PREVIOUS LAYER IS ASSIGNED AND PROCEED TO STEP 2 FOR A SUBSEQUENT LAYER LYING BELOW THE PREVIOUS EXAMINED LAYER;
7. IF YES, AND IF THE ZERO AREA IN THE EXAMINED LAYER OVERLAPS MORE THAN ONE ZERO AREA IN THE PREVIOUS EXAMINED LAYER, AND ALL OF THE OVERLAPPED ZERO AREAS IN THE PREVIOUS EXAMINED LAYER ARE ASSIGNED TO THE SAME CAVITY, THEN ASSIGN THE ZERO AREA IN THE EXAMINED LAYER TO THE SAME CAVITY AS THAT TO WHICH THE OVERLAPPED ZERO AREAS IN THE PREVIOUS EXAMINED LAYER IS ASSIGNED AND PROCEED TO STEP 2 FOR A SUBSEQUENT LAYER LYING BELOW THE PREVIOUS EXAMINED LAYER;
8. IF YES, AND IF THE ZERO AREA IN THE EXAMINED LAYER OVERLAPS MORE THAN ONE ZERO AREA IN THE PREVIOUS EXAMINED LAYER, AND THE OVERLAPPED ZERO AREAS IN THE PREVIOUS EXAMINED LAYER ARE ASSIGNED TO DIFFERENT CAVITIES, THEN ASSIGN THE ZERO AREA IN THE EXAMINED LAYER AND REASSIGN ALL ZERO AREAS COMMUNICATING THEREWITH IN EARLIER EXAMINED LAYERS TO A SINGLE CAVITY, DISCARD THE REMAINING CAVITY DESIGNATIONS FOR THE REASSIGNED ZERO AREAS, AND PROCEED TO STEP 2 FOR A SUBSEQUENT LAYER LYING BELOW THE PREVIOUS EXAMINED LAYER;
9. ONCE ALL OF THE LAYERS OF THE MATRIX HAVE BEEN EXAMINED, DETERMINE THE MINIMUM AND MAXIMUM VALUES OF X, Y AND Z OF EACH CAVITY;
10. IF ANY OF THESE VALUES LIES AT THE PERIPHERY OF THE MATRIX, DISCARD SUCH CAVITY, AS IT IS NOT ISOLATED. ALL OTHER CAVITIES ARE CONSIDERED TO BE ISOLATED;
11. FOR EACH ISOLATED CAVITY CHOOSE X AND Y COORDINATES ON THE EXTREME TOP AND BOTTOM LOCATIONS THEREIN HAVING RESPECTIVE HIGHEST AND LOWEST Z VALUES;
12. FOR EACH CAVITY, ASSIGN ZERO VALUES TO LOCATIONS HAVING THE SAME X AND Y COORDINATES AS THE TOP LOCATION OR COORDINATES IN THE VICINITY THEREOF AND HIGHER Z VALUES THAN THE TOP LOCATION, THUS DEFINING A CONDUIT;
13. FOR EACH CAVITY, ASSIGN ZERO VALUES TO LOCATIONS HAVING THE SAME X AND Y COORDINATES AS THE BOTTOM LOCATION OR COORDINATES IN THE VICINITY THEREOF AND LOWER Z VALUES THAN THE BOTTOM LOCATION, THUS DEFINING A CONDUIT;
14. OPTIONALLY, THE STEPS 12 AND 13 MAY BE TERMINATED WHEN THE CHANNELS DEFINED THEREBY COMMUNICATE WITH A CAVITY WHICH ALREADY HAS DEFINED IN ASSOCIATION THEREWITH CONDUITS COMMUNICATING WITH THE PERIPHERY OF THE MATRIX.
15. OPTIONALLY, THE CHANNELS MAY BE BLOCKED AFTER DRAINAGE BY FILLING OR PARTIALLY FILLING THEM WITH SOLIDIFIABLE LIQUID AND THEN SOLIDIFYING THEM.

Figure 6:
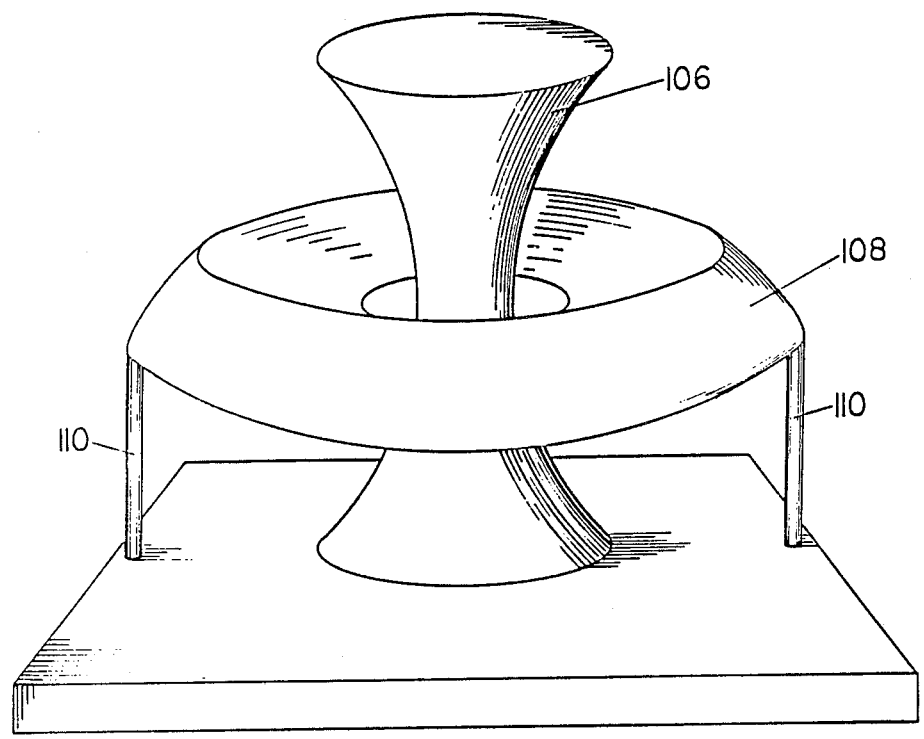
FIG. 6 is a pictorial illustration of a complex object formed in accordance with the present invention and including support legs integrally formed therewith.

Reference is now made to FIG. 6, which illustrates an object comprising mutually isolated parts 106 and 108. In accordance with a preferred embodiment of the present invention, support legs 110 are generated to support the isolated parts on the floor of the container or onto another part which is, itself, suitably supported. The thickness of the support legs is preferably determined by the load to be supported thereby during modelling, which in turn is determined by the difference between the specific gravity of the solidifiable material in its solid and liquid states.

The formation of such support legs takes place in accordance with the following sequence of operative steps:
1. START EXAMINING A LAYER (THE EXAMINED LAYER) AT THE TOP OF THE THREE DIMENSIONAL MATRIX AND BEGIN TO CHECK EACH LAYER, LAYER BY LAYER;
2. CHECK WHETHER THE EXAMINED LAYER OF THE MATRIX IS ALSO THE LOWEST LAYER. IF YES, GO TO STEP 9;
3. IDENTIFY THE AREAS IN THE EXAMINED LAYER HAVING A UNITARY BINARY VALUE (ONE AREAS). (THIS MAY BE ACHIEVED USING AN ALGORITHM AVAILBLE IN THE "CLAR" FUNCTION IN THE R-280 SYSTEM OF SCITEX CORPORATION LTD.);
4. CHECK WHETHER THE ONE AREAS IN THE EXAMINED LAYER OVERLAP ANY ONE AREAS IN THE PRECEDING LAYER THAT WAS CHECKED;
5. IF NO, DECLARE A NEW PART AND ASSIGN THE NON OVERLAP ONE AREAS THERETO AND PROCEED TO STEP 2 FOR A SUBSEQUENT LAYER LYING BELOW THE PREVIOUS EXAMINED LAYER;
6. IF YES, AND IF THE ONE AREA IN THE EXAMINED LAYER OVERLAPS EXACTLY ONE ONE AREA IN THE PREVIOUS EXAMINED LAYER, ASSIGN IT TO THE SAME PART AS THAT TO WHICH THAT ONE AREA IN THE PREVIOUS EXAMINED LAYER IS ASSIGNED AND PROCEED TO STEP 2 FOR A SUBSEQUENT LAYER LYING BELOW THE PREVIOUS EXAMINED LAYER;

7. IF YES, AND IF THE ONE AREA IN THE EXAMINED LAYER OVERLAPS MORE THAN ONE ONE AREA IN THE PREVIOUS EXAMINED LAYER AND ALL OF THE OVERLAPPED ONE AREAS IN THE PREVIOUS EXAMINED LAYER ARE ASSIGNED TO THE SAME PART, THEN ASSIGN THE ONE AREA IN THE EXAMINED LAYER TO THE SAME PART AS THAT TO WHICH THE OVERLAPPED ONE AREAS IN THE PREVIOUS EXAMINED LAYER ARE ASSIGNED AND PROCEED TO STEP 2 FOR A SUBSEQUENT LAYER LYING BELOW THE PREVIOUS EXAMINED LAYER;

8. IF YES, AND IF THE ONE AREA IN THE EXAMINED LAYER OVERLAPS MORE THAN ONE AREA IN THE PREVIOUS EXAMINED LAYER, AND THE OVERLAPPED ONE AREAS IN THE PREVIOUS EXAMINED LAYER ARE ASSIGNED TO DIFFERENT PARTS, THEN ASSIGN THE ONE AREA IN THE EXAMINED LAYER AND REASSIGN ALL ONE AREAS COMMUNICATING THEREWITH IN EARLIER EXAMINED LAYERS TO A SINGLE PART, DISCARD THE REMAINING PART DESIGNATIONS FOR THE REASSIGNED ONE AREAS, AND PROCEED TO STEP 2 FOR A SUBSEQUENT LAYER LYING BELOW THE PREVIOUSLY EXAMINED LAYER;

9. ONCE ALL OF THE LAYERS OF THE MATRIX HAVE BEEN EXAMINED, DETERMINE THE MINIMUM AND MAXIMUM VALUES OF X, Y AND Z FOR ALL OF THE PARTS;

10. IF ANY OF THE VALUES OF MINIMUM Z EQUALS ONE, THEN DISCARD THAT PART SINCE IT LIES ON THE BOTTOM OF THE MATRIX AND DOES NOT REQUIRE SUPPORT. DECLARE ALL REMAINING PARTS, "ISOLATED PARTS";

11. FOR EACH ISOLATED PART DETERMINE FOUR POINTS WITH EXTREME X AND Y COORDINATES. PREFERABLY CHOOSE SUCH LOCATIONS HAVING DIVERGENT X AND Y VALUES, SO AS TO PROVIDE WIDE SUPPORT FOR THE PART;

12. FOR EACH PART, ASSIGN ONE VALUES TO LOCATIONS HAVING THE SAME X AND Y COORDINATES AS THE EXTREME LOCATIONS OR COORDINATES BEING WITHIN A PREDETERMINED RANGE, SUCH AS 1 MM OF THE LOCATION COORDINATES OF THE EXTREME LOCATIONS AND LOWER Z VALUES THAN THE EXTREME LOCATIONS, THUS DEFINING A PLURALITY OF SUPPORT LEGS;

13. OPTIONALLY, THE STEPS 11 AND 12 MAY BE TERMINATED WHEN THE SUPPORT LEGS DEFINED THEREBY ENGAGE A PART WHICH ALREADY HAS DEFINED IN ASSOCIATION THEREWITH CONDUITS COMMUNICATING WITH THE PERIPHERY OF THE MATRIX.

Figure 7:
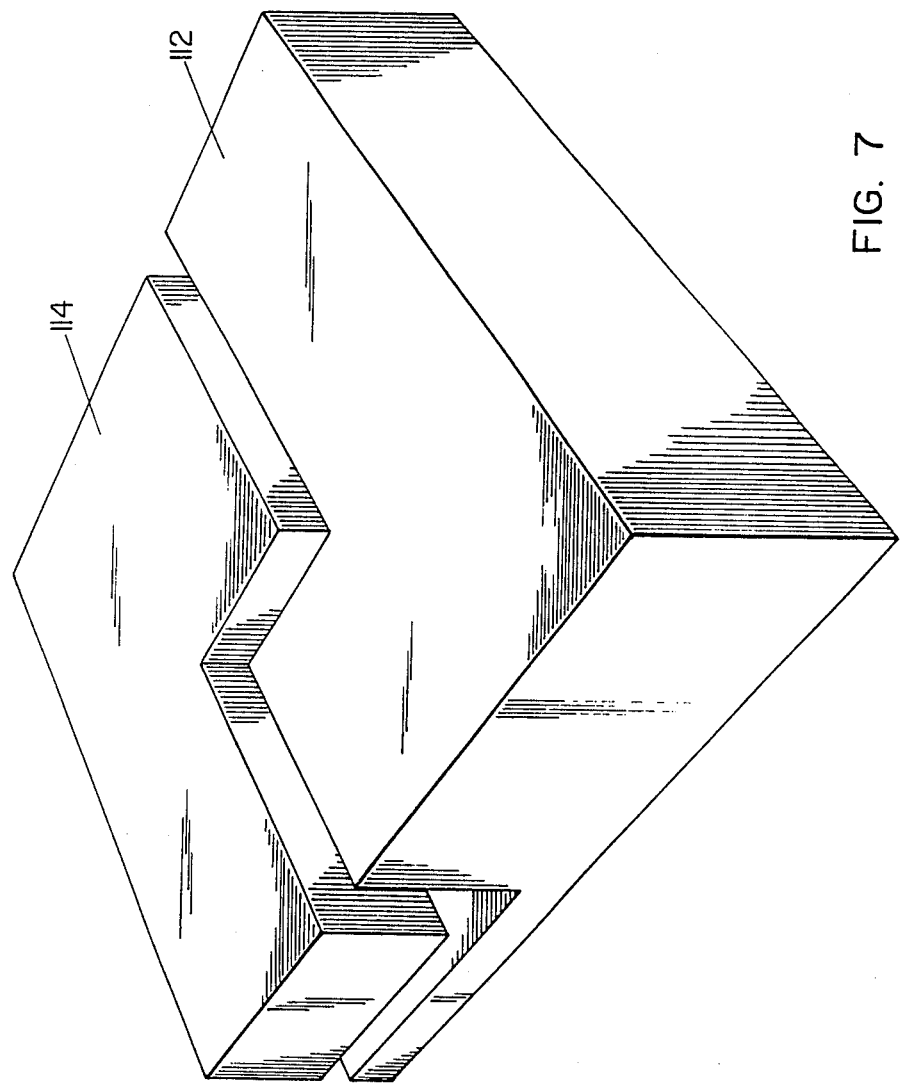
FIG. 7 is a pictorial illustration of two nested objects formed in accordance with the present invention.

Additionally in accordance with a preferred embodiment of the present invention, as seen in FIG. 7 a plurality of separate objects 112 and 114 (FIG. 7) may be modelled together and placed with respect to each other so that they do not touch, while at the same time, the plurality of objects is mutually nested so as to occupy a minimum overall volume.

A technique for efficient nesting of a plurality of objects to be modelled at the same time may take place in accordance with the following sequence of operative steps:

1. FOR EACH OF THE OBJECTS TO BE MODELLED, DETERMINE THE EXTREME COORDINATES AND COMPUTE A MINIMUM BOUNDING VOLUME IN THE FORM OF A BOX FOR EACH SUCH OBJECT;

2. SORT THE BOUNDING VOLUMES IN DECREASING ORDER OF VOLUME;

3. DEFINE A THREE-DIMENSIONAL RASTER MATRIX (MASTER MATRIX) IN WHICH THE OBJECTS WILL BE LOCATED;

4. PLACE THE BIGGEST BOUNDING VOLUME IN THE MATRIX BY COPYING THE CONTENTS OF THE MATRIX OF THAT OBJECT INTO THE MASTER MATRIX, STARTING AT LOCATION (1, 1, 1);

5. FOR EACH OF THE REMAINING BOUNDING VOLUMES, START WITH THE NEXT BIGGEST VOLUME AND PROCEED ONE BY ONE UNTIL THE SMALLEST VOLUME IS REACHED, IN EACH CASE DETERMINE AN ORIENTATION IN THE MASTER MATRIX IN WHICH IT CAN BE PLACED WITHOUT OVERLAPPING OR TOUCHING ANY OF THE PREVIOUSLY LOCATED BOUNDING VOLUMES, WHILE CAUSING NO EXPANSION OR A MINIMAL EXPANSION OF THE ORIGINALLY SELECTED MASTER MATRIX DEFINED VOLUME. IN THE COURSE OF FITTING TRIALS, THE 6 POSSIBLE ORTHOGONAL ORIENTATIONS MAY BE TRIED;

6. WHEN THE BEST FIT IS FOUND, PLACE EACH OF THE REMAINING BOUNDING VOLUMES IN ITS BEST FIT LOCATION;

7. THE PROCEDURE FOR GENERATING SUPPORT LEGS DESCRIBED ABOVE IN CONNECTION WITH FIG. 6 MAY BE EMPLOYED TO PROVIDE SUPPORTS BETWEEN ADJACENT NON-TOUCHING OBJECTS. ANY OTHER SUITABLE TECHNIQUE MAY ALSO BE EMPLOYED FOR THIS PURPOSE.

Reference is now made to FIGS. 8A and 8B which illustrate the modelling of an object which includes initially isolated portions which are joined as the model is built up from bottom to top. FIG. 8A shows the model at an intermediate stage having a portion 120 isolated from the main portion 122, such that portion 120 requires support. FIG. 8B shows the completed model wherein the two portions have been joined such that portion 120 does not require additional support.

Figure 9:
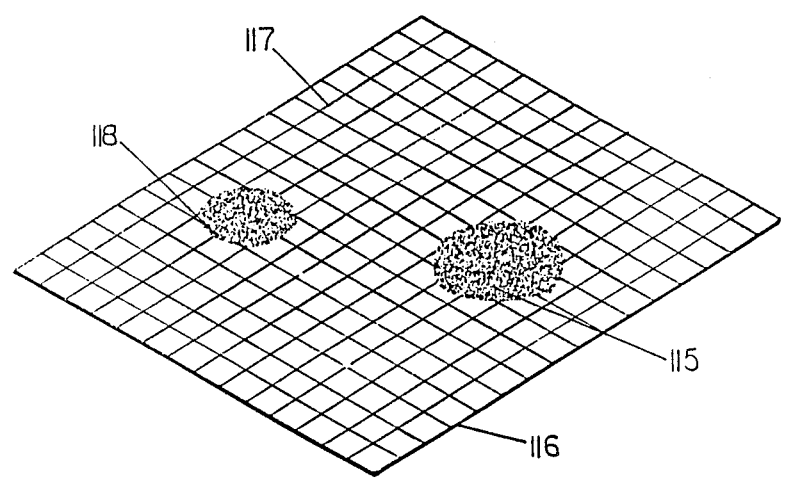
FIG. 9 is an illustration of an isolated object supported on a support mesh in accordance with the present invention.

The provision of intermediate support may be realized by initially identifying those portions which require intermediate support and afterwards generating either support legs, as described hereinabove in connection with FIG. 6 or by generating a support mesh as illustrated in FIG. 9.

The steps of identifying those portions which require support may include the following sequence of operative steps:

1. START EXAMINING A LAYER (THE EXAMINED LAYER) AT THE BOTTOM OF THE THREE DIMENSIONAL MATRIX AND BEGIN TO CHECK EACH LAYER, LAYER BY LAYER;
2. IDENTIFY THE AREAS IN THE EXAMINED LAYER HAVING A UNITARY BINARY VALUE (ONE AREAS). (THIS MAY BE ACHIEVED USING AN ALGORITHM AVAILABLE IN THE "CLAR" FUNCTION IN THE R-280 SYSTEM OF SCITEX CORPORATION LTD.);
3. CHECK WHETHER THE ONE AREAS IN THE EXAMINED LAYER OVERLAP ANY ONE AREAS IN THE PRECEDING LAYER THAT WAS CHECKED;
4. IF NO, DECLARE AN ISOLATED AREA AND PROCEED WITH THE FOLLOWING STEPS. IF YES PROCEED TO STEP 2 FOR THE NEXT LAYER;
5. GENERATE A SUPPORT FOR EVERY ISOLATED AREA, EITHER BY THE TECHNIQUE DESCRIBED ABOVE IN CONNECTION WITH FIG. 6 OR BY GENERATING A MESH AS FOLLOWS;
6. WRITE FROM MEMORY A TWO DIMENSIONAL MESH MATRIX, TYPICALLY LYING IN A PLANE PARALLEL TO THE SOLIDIFICATION PLANE AND INCLUDING LINES OF WIDTH OF THE ORDER OF 1-3 VEXELS. THE MESH IS SUPERIMPOSED ON THE PLANE OF THE ISOLATED AREA AND JOINS THE ISOLATED AREA TO THE WALLS OF THE CONTAINER AND TO STABLE OBJECTS THEREWITHIN. THE MESH MAY READILY BE REMOVED WHEN THE MODEL IS COMPLETED.

Additionally in accordance with an embodiment of the invention, reference markings may be incorporated in the model by selectably changing the coloring of the solidifiable liquid at predetermined layers.

Figure 10A:
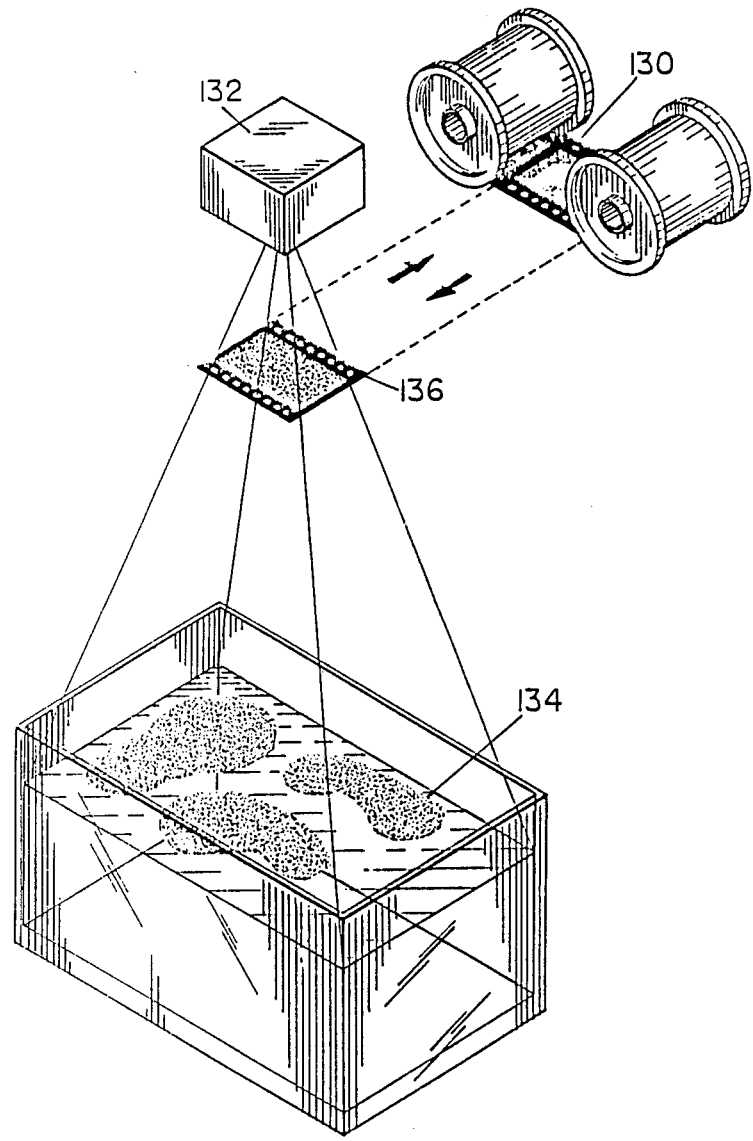
FIG. 10A is a pictorial illustration of optical apparatus useful in the apparatus of FIG. 3.
Figure 10B:
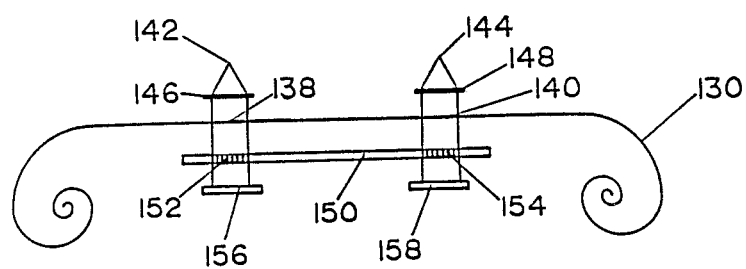
FIG. 10B is a side view illustration of micropositioning apparatus useful in the present invention.
Figure 10:
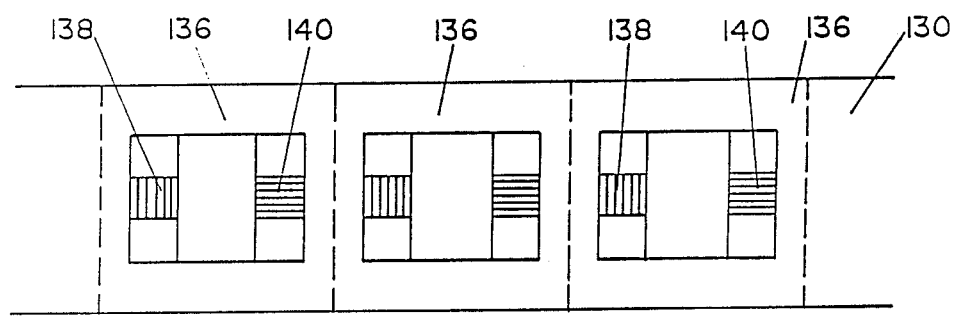
FIG. 10C is an illustration of film bearing Ronchi ruling patterns for micropositioning.

Reference is now made to FIGS. 10A-10C which illustrate projection apparatus and more particularly, precise positioning apparatus useful therein in accordance with a preferred embodiment of the present invention.

In accordance with an embodiment of the invention, the configuration of the solid object for each layer is photographically recorded on film 130 which is associated with a light source 132, which projects the image thereof onto the solidification plane 134.

According to a preferred embodiment of the invention, each film segment 136 is provided with micropositioning patterns thereon, such as perpendicularly extending Ronchi rulings 138 and 140, illustrated on a plurality of segments of a film strip 130 in FIG. 10C.

Optical microprocessing using the Ronchi rulings seen in FIG. 10C may be achieved using the apparatus of FIG. 10B, which includes a pair of light sources 142 and 144, which are preferably quasi punctual light sources such as pin point lamps, miniature lamps or extremities of fiberoptic light guides. The light from sources 142 and 144 passes though collimating lenses 146 and 148 respectively, producing parallel beams of light which pass through respective rulings 138 and 140 on film 130. Disposed below film 130 on a substrate 150 are reference Ronchi rulings 152 and 154 which correspond exactly to rulings 138 and 140. Optical detectors 156 and 158 detect the amount of light passing through the respective rulings 138 and 140 and 152 and 154 in order to provide an electrical output indication of registration between the rulings on the film and those on the reference substrate 150 in two dimensions.

The output indication may be supplied to a drive motor which operates, typically in a closed loop, to provide precise positioning of the film 130 in the projector.

Figure 11:
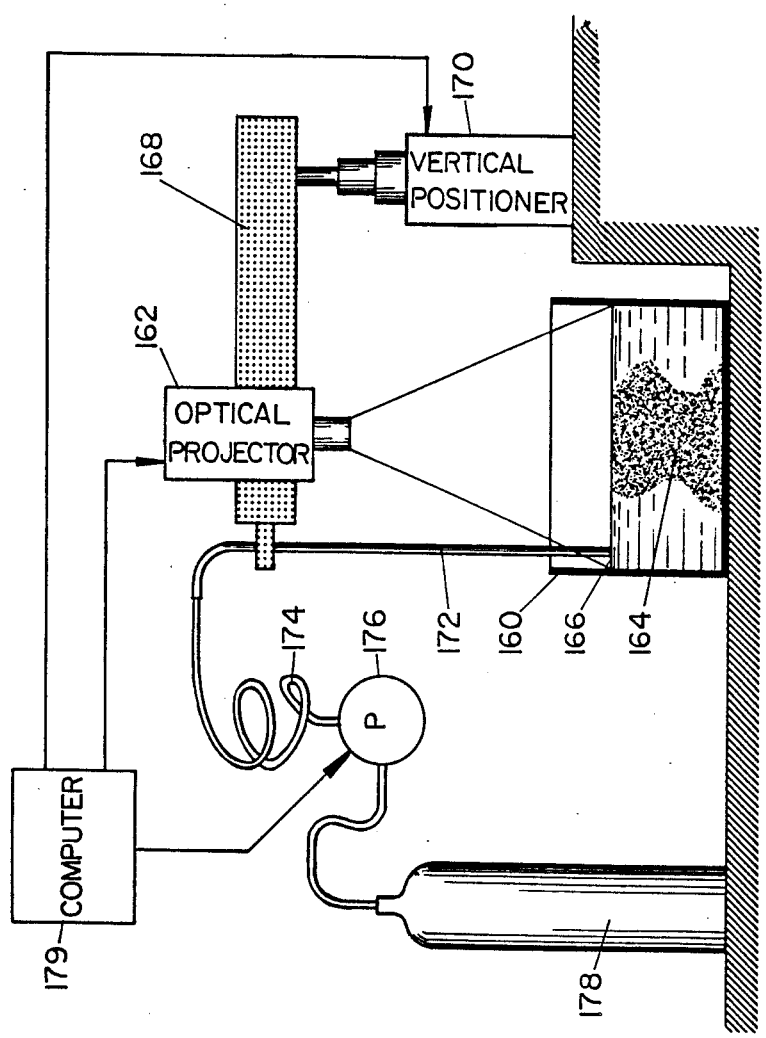
FIG. 11 is a side view illustration of solidifiable liquid supply, containing and exposure apparatus according to an alternative embodiment of the invention, wherein the container is static and the solidification plane moves relative thereto.

Reference is now made to FIG. 11, which illustrates an alternative modelling arrangement wherein the container 160 in which the model is formed is maintained stationary, and the optical projector 162 is translated along a vertical axis relative thereto. In this embodiment, as a model 164 is built up inside the container, the solidifications plane 166 rises and optical projector 162, mounted on a mechanical support 168, is raised by the same distance, as by a digitally controlled vertical positioner 170, such as a motor driven stage, such as model ATS200 available from Aeroteck Ltd. of Newbury, England. The embodiment of FIG. 11 has the advantage that the container and the liquid may be essentially mechanically isolated from moving parts of the modelling apparatus, thus preventing disturbance of the solidifiable liquid by vibrations caused by moving parts in the modelling apparatus.

Further in accordance with a preferred embodiment of the present invention, a solidifiable liquid feeding tube 172 is also mounted on support 168 and moves together therewith, such that the outlet end of tube 172 is located at or just slightly above or below the solidification surface at all times. Solidifiable liquid is supplied to tube 172 from a reservoir 178 via a flexible conduit 174 and a pump 176, (such as a digitally controlled pump, for example a digitally driven dispenser manufactured by Masterflex). A computer 179 controls and coordinates the operations of pump 176 and a positioner 170.

It may be appreciated that in the embodiment of FIG. 11, the optical distance between the optical projector 162 and the solidification plane 166 is kept constant and the solidifiable liquid is always fed at or near the solidification plane.

Figure 12:
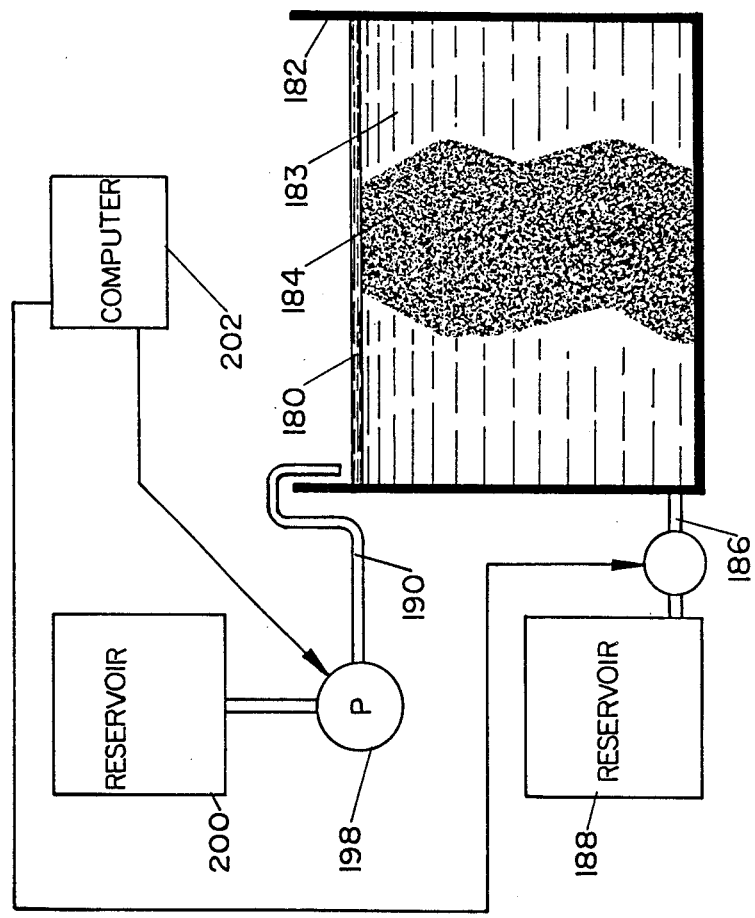
FIG. 12 illustrates an arrangement wherein a support material is disposed under a layer of solidifiable liquid during modelling.

Reference is now made to FIG. 12 which illustrates an alternative embodiment of the invention wherein a solidifiable liquid layer 180 is provided in a container 182 only at the solidification plane. Therebelow is disposed a support material 183, typically in liquid form, which is not solidifiable in response to the same radiation as is the solidifiable liquid layer 180.

Accordingly, the depth of solidification is determined by the thickness of the solidification liquid layer 180. As a model 184 is built up in the container 182, the height of the support material is increased accordingly such that it reaches to just below the solidification plane. Support material in liquid form may be supplied from a support material reservoir 188 through a conduit 186 communicating with the bottom of container 182.

The support material is heavier than the solidifiable liquid and may comprise, for example, mercury or galium, an eutectic alloy, such as an alloy comprising 44.7% bismuth, 22.6% lead, 8.3% tin, 5.3% cadmium and 19.1% indium. Such alloy has a melting temperature of 46.8 degrees C. and a specific gravity of 6.1. Alternatively, the support material may comprise a suspension of metal particles, such as aluminum dust, in water, or in a saline solution. Another possible support material is a 30% solution of calcium chloride in water. The support material may be either transparent or reflective or partially transparent. It should not be soluble in the solidifiable liquid and should have a higher surface tension than the solidifiable liquid to allow even spreading of the solidifiable liquid thereover. A specific example of a combination of a solidifiable liquid and a support material is 6178 manufactured by Vitralit (T.M.) of Zurich, Switzerland as the solidifiable material and a calcium chloride solution as the support material.

According to a further alternative embodiment of the invention, the support material may be solidifiable, although not in response to the same radiation which is operative to cause solidification of the solidifiable liquid. An example of such a support material is a heated wax, such as Carbowax 1540 available from Union Carbide, which may be supplied in a liquid form.

Solidifiable liquid is supplied via a conduit 190 by one of a number of possible techniques, examples of which are described hereinbelow. According to a preferred embodiment of the invention, the quantity of solidifiable liquid to be supplied at any given time is determined by a computer 202 and controls the operation of a pump 198, which provides the solidifiable liquid from a reservoir 200. Pump 198 is operative to provide a fixed quantity of solidifiable liquid less the amount of solidifiable liquid wnhich is determined to be left over from modelling of the previous layer. The amount of solidifiable liquid left over is readily determined from information stored in computer 202 indicating the area which is solidified in a given layer.

Figure 13A:
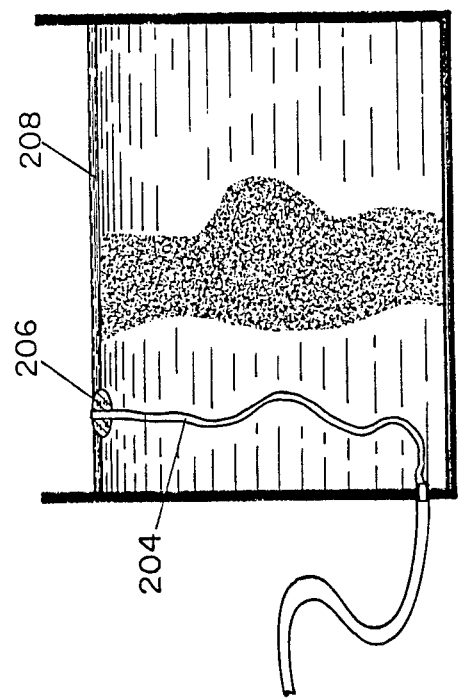

FIG. 13A shows one technique for supplying solidifiable material to the solidification plane. Here a flexible conduit 204 is supported on a float 206 on the solidification liquid layer 208 such that solidifiable liquid exits at the surface of the solidification liquid layer with minimum disturbance to such surface.

Figure 13B:
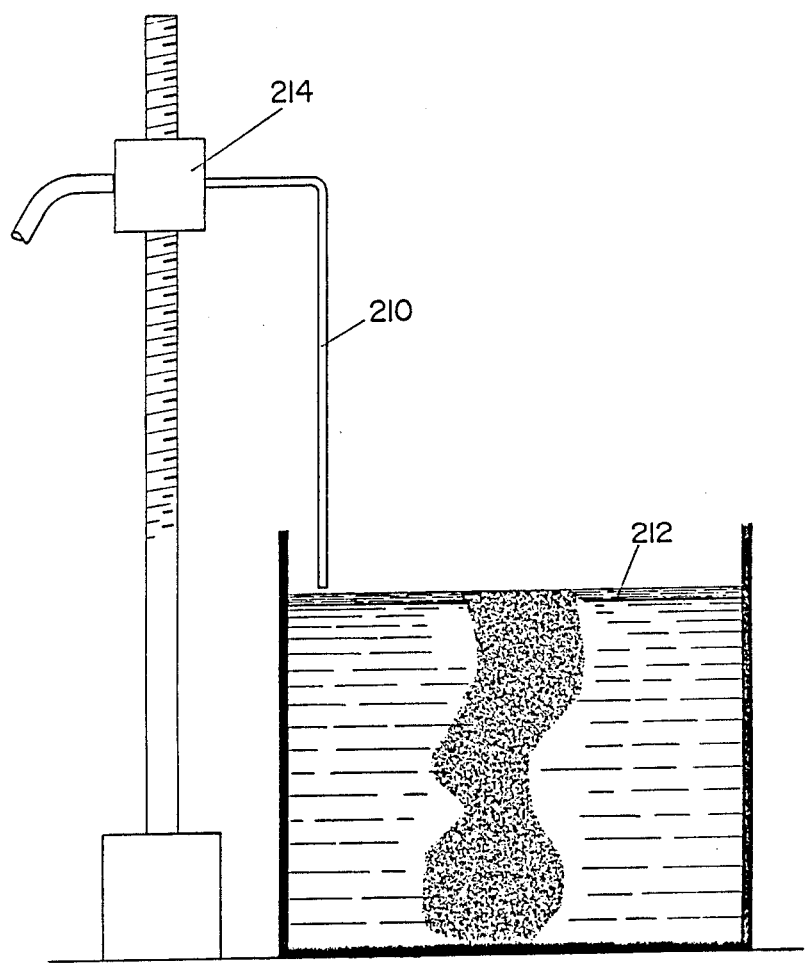

An alternative supply arrangement is illustrated in FIG. 13B, in which the container is stationary and the optical apparatus moves, as shown in FIG. 11. In FIG. 13B, for the sake of simplicity, only a feed tube 210 is shown terminating just above the solidifiable liquid layer 212 and in non-contacting relationship thereto, so as to obviate the need for cleaning the feed tube. Feed tube 210 is movably positioned on a vertical positioning device 214, so as to be maintained such that its termination is always a predetermined small distance above or below the solidifiable liquid layer 212.

Reference is now made to FIGS. 13C and 13D which show a further alternative technique for feeding solidifiable liquid to the solidification plane. FIG. 13C illustrates in side sectional view the layer by layer build up of both a model 220 and a branched feed tube 222. The branched feed tube communicates with a fixed solidifiable liquid feed conduit 224 and is branched to provide a desired distribution of solidifiable liquid at the solidification plane so as to shorten the time required for stabilization of the solidifiable liquid layer before irradiation thereof.

FIG. 13D is a collection of illustrations of the various layers showing the hollow nature of the sections of the feed tube 222 and the branching thereof. Each layer is labelled to correspond with a layer shown in FIG. 13C having the same number.

Figure 13E:
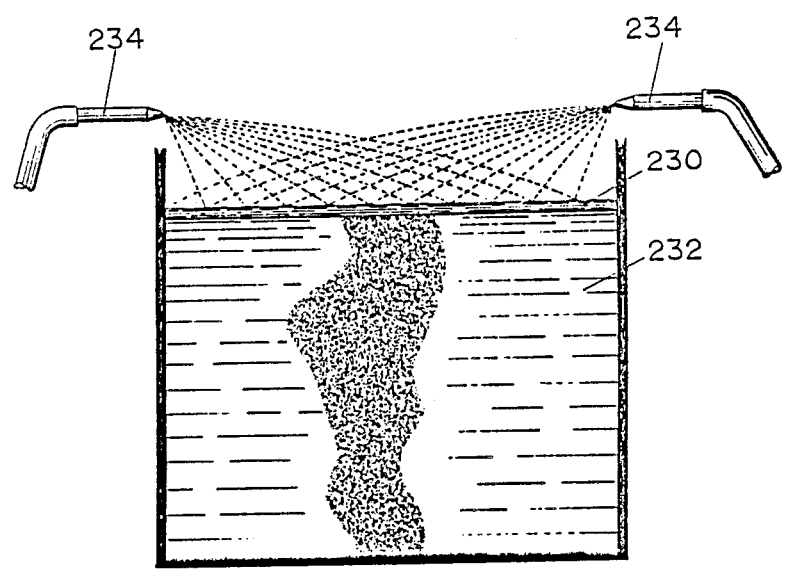
Figure 13F:
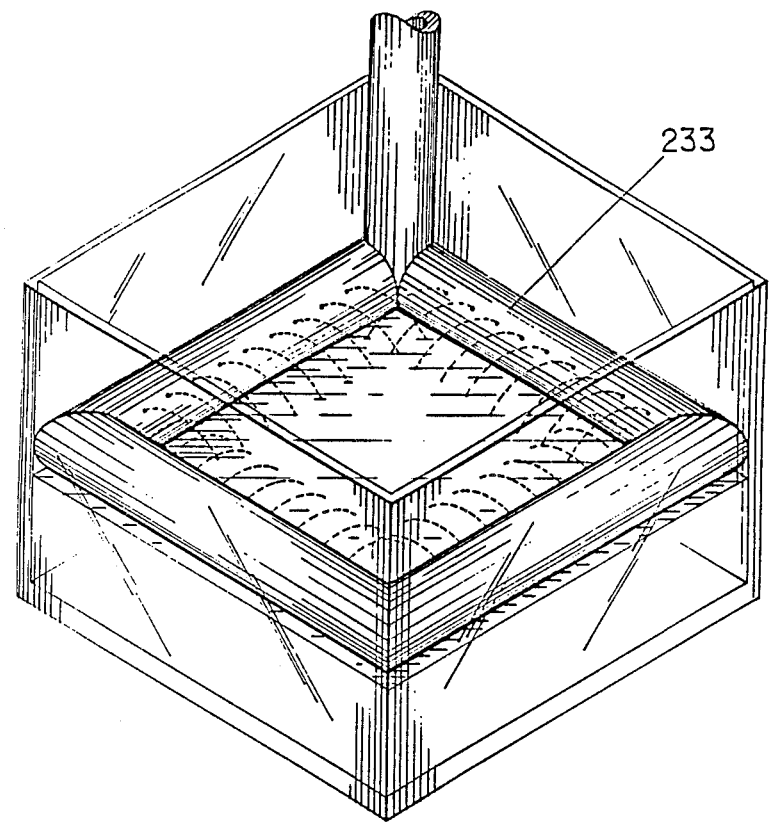

FIG. 13E illustrates a further alternative embodiment of the invention wherein a solidifiable liquid layer 230 is sprayed over the support material 232 by nozzles 234. FIG. 13F shows a further alternative embodiment of a peripheral spray manifold 233 that is disposed just above the solidification plane.

Reference is now made to FIG. 14, which illustrates another technique for limiting the depth of solidification. In this embodiment, a relatively thin layer 240 of a polymerizable liquid that either reflects or absorbs the energy used to solidify the solidifiable liquid is spread on top of each layer of solidifiable liquid after radiation but before an additional layer of solidifiable liquid is spread thereover. Layer 240 typically comprises a dyed formulation of the solidifiable liquid itself. A suitable dye is Rhodamine B, manufactured by Eastman Kodak Company of Rochester, N.Y., U.S.A. This method can also be used to die the volume of the object in desired colors.

FIG. 14 illustrates a plurality of solidifiable layers 242 including polymerized portions 244 and non-polymerized portions 246 having layers 240 interspersed therebetween. Layers 240 also include polymerized portions 248 and non-polymerized portions 250.

According to an alternative embodiment of the present invention, the blocking layer may comprise a suspension of metallic particles, such as aluminum powder in a monomer such as 6180 manufactured by Vitralit (T.M.) of Zurich, Switzerland, and operates as a reflective layer.

According to a further alterative embodiment of the invention, illustrated in FIGS. 15A, 15B and 15C, a chemical inhibition technique may be employed to limit the depth of solidification of the solidification liquid. As illustrated in FIG. 15A, a solidifiable layer 260, typically comprising an epoxy resin, (for example UVR-6100 available from Union Carbide) combined with a hardener commonly used in epoxy glues such as an amine, which is a chemical base and a photoinitiator, such as UV-1014 available from General Electric Company, Schenectady, N.Y., which is responsive to UV radiation for releasing an acid, may be irradiated by a first type of radiation, such as infra-red energy supplied by an IR laser such as manufactured by Laser Industries, Inc. Tel-Aviv, Israel, producing thermal polymerization and consequent hardening of a desired area of the solidifiable layer.

Thereafter, as illustrated in FIG. 15B, the solidifiable layer 260 is flooded with UV radiation, which is absorbed by the photoinitiator in the solidifiable layer, causing release of the acid, which inhibits any further polymerization in layer 260, thus neutralizing the solidifiable feature of the solidifiable layer 260 so irradiated.

Finally, as illustrated in FIG. 15C, a fresh layer 262 of solidifiable liquid is supplied over layer 260, and the cycle is repeated. Upon IR radiation of layer 262, the neutralized layer 260 will not solidify.

In accordance with the present invention, a problem of spatial distortion due to shrinkage of the solidifiable material upon solidification may be encountered. As noted above, such shrinkage may be as much as 2% in each linear dimension. According to one embodiment of the present invention, the problem of shrinkage may be overcome by using a multiple step irradiation technique, wherein an initial irradiation takes place followed by shrinkage. Excess solidifiable material tends to move into the region vacated by the shrinkage. A second irradiation step, typically in the same pattern as the first step, takes place. Subsequent irradiation, hardening and filling in cycles may also take place, as desired. The above technique for overcoming the shrinkage problem may also be carried out in a continuous manner, by extending the duration of application of the radiation.

According to an alternative embodiment of the present invention, a non-shrinking solidifiable liquid may be provided by mixing into the usual shrinkage solidifiable liquid another liquid which expands upon solidification by about the same amount that the shrinkage solidifiable liquid shrinks. The ratio of the two components may be adjusted according to their shrinkage coefficients, so that the mixture has a zero or near zero overall shrinkage coefficient. A typical monomer that expands upon polymerization is Norbornene Spiroorthocarbonate, which is mentioned in the proceedings of RADCURE, 1984, at page 11-1. It may be mixed with epoxy-type photopolymers which have the usual shrinkage coefficients of about 2%.

Distortions due to stresses in the model generated during a final curing step may be avoided by eliminating the final curing step, which is made possible by fully curing each layer as it is formed by overexposure of each solidification layer as it is formed.

According to a further alternative embodiment of the present invention, the effects of shrinkage may be reduced by avoiding the simultaneous irradiation and solidification of large areas of the solidifiable layer. In this connection reference is made to FIGS. 16A–16D, which illustrate two step irradiation of a given pattern in complementary checkerboard patterns.

Figure 16D:
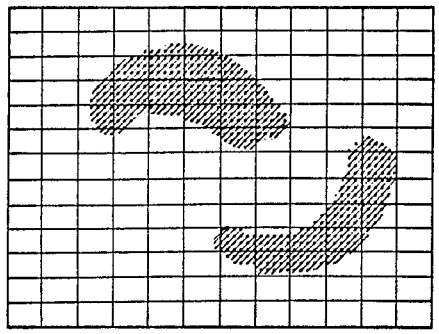
FIGS. 16A, 16B, 16C and 16D illustrate a technique for shrinkage compensation employing radiation through complementary masks.
Figure 16C:
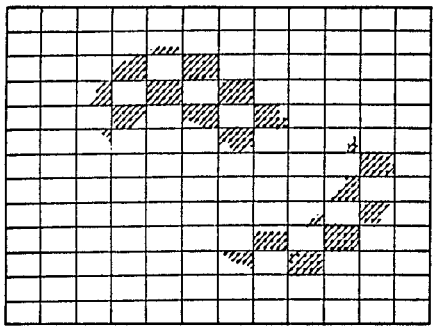
Figure 16B:
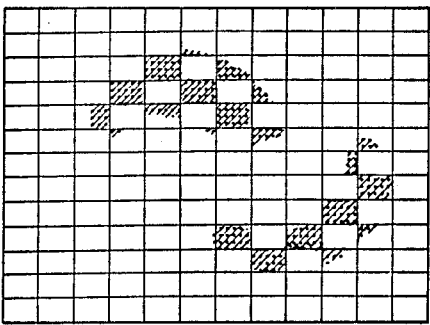
Figure 16A:
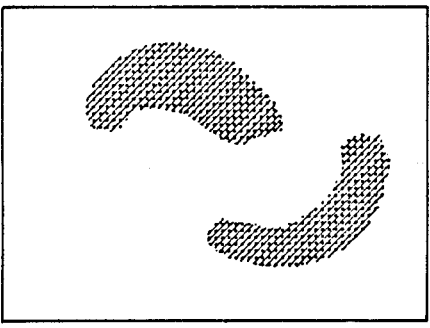

FIG. 16A shows a typical solidification pattern mask for a given layer of a model. In accordance with an embodiment of the invention, this pattern is broken down into two complementary typically checkerboard pattern masks, illustrated in FIGS. 16B and 16C. This pattern breakdown may be realized either photographically, using appropriate screens or electronically by a logical AND operation between a mask pattern and a data pattern.

The solidifiable layer is exposed through each of the complementary pattern masks separately, such that distortions due to shrinkage following the first exposure are at least partially compensated during the second exposure. If necessary, a third exposure may be carried out using a mask which corresponds to the complete pattern or selected portions thereof for filling in any unsolidified spaces in the pattern. The result of the complementary pattern exposure technique is a superimposed solidified pattern as seen in FIG. 16D.

According to a further alternative embodiment of the present invention, shrinkage compensation may be achieved by distorting the exposure masks through pre-processing so as to take into account expected shrinkage in the finished model. Such a technique is employed in molding or casting when molds are distorted for such purpose.

Reference is now made to FIGS. 17A–17D, which illustrate another particular feature of the present invention. In contrast to the prior art discussed in the Background, which operates to move the model in stepwise fashion, the present invention may employ continuous relative movement between the optical system and the container.

Figure 17A:
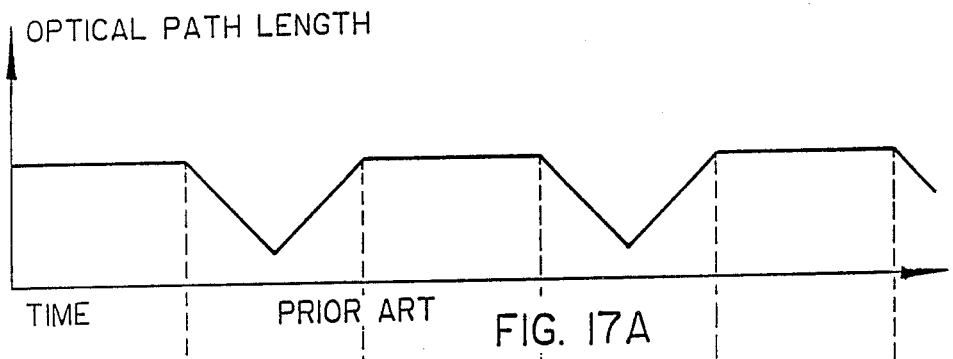
FIGS. 17A, 17B, 17C and 17D illustrate operation cycles over time for the prior art and for the present invention.
Figure 17B:
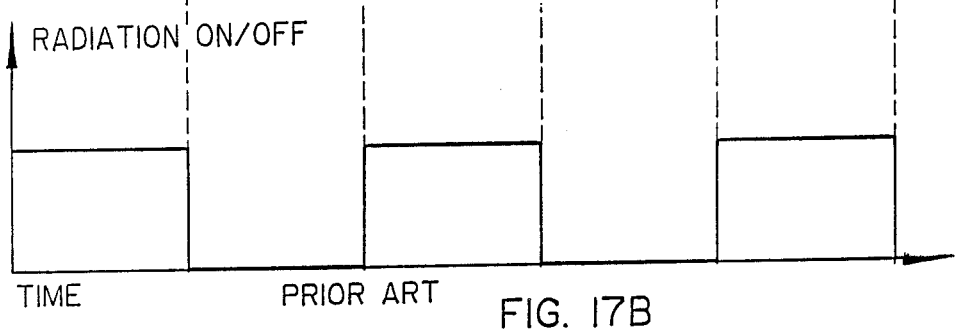

FIG. 17A, illustrates the variation in the optical length between the plane of the mask and the solidification plane for the prior art apparatus over time. FIG. 17B illustrates the on-off operation of the radiation apparatus over the same time scale for the prior art apparatus. It is seen that in the prior art, the optical length remains constant during radiation and is subsequently decreased during repositioning and during addition of further solidifiable material.

Figure 17C:
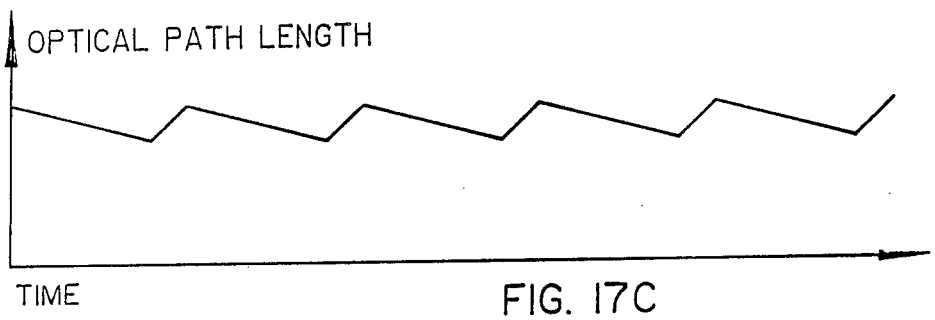
Figure 17D:
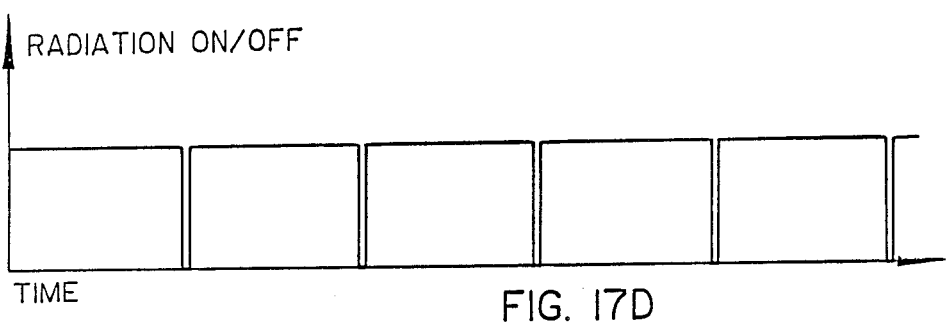

FIGS. 17C and 17D illustrate the analogs to FIGS. 17A and 17B for the apparatus of the present invention and indicate that the radiation apparatus is in continuous operation, while the optical length varies even during radiation, except for interruptions for mask replacement in the indirect exposure method. As a result, as can be seen by comparing FIGS. 17A and 17C, many more radiation cycles may be completed in unit time using the apparatus of the present invention than was possible using the prio art apparatus, thereby producing greatly enhanced modelling speed.

Continuous relative movement between the mask 38 (in the context of FIG. 2B) or its electronic analog in the context of FIG. 2A and the solidification plane in accordance with the present invention, even during radiation, is made possible by the appreciation that the depth of focus of the optical system is such that it is more than twice the thickness of the solidifiable layer and thus variations in the optical length have no significant effect on quality of accuracy of the imaged pattern. It should be noted, that if material is continuously supplied, the graph in FIG. 17C can be made flat.

Figure 18:
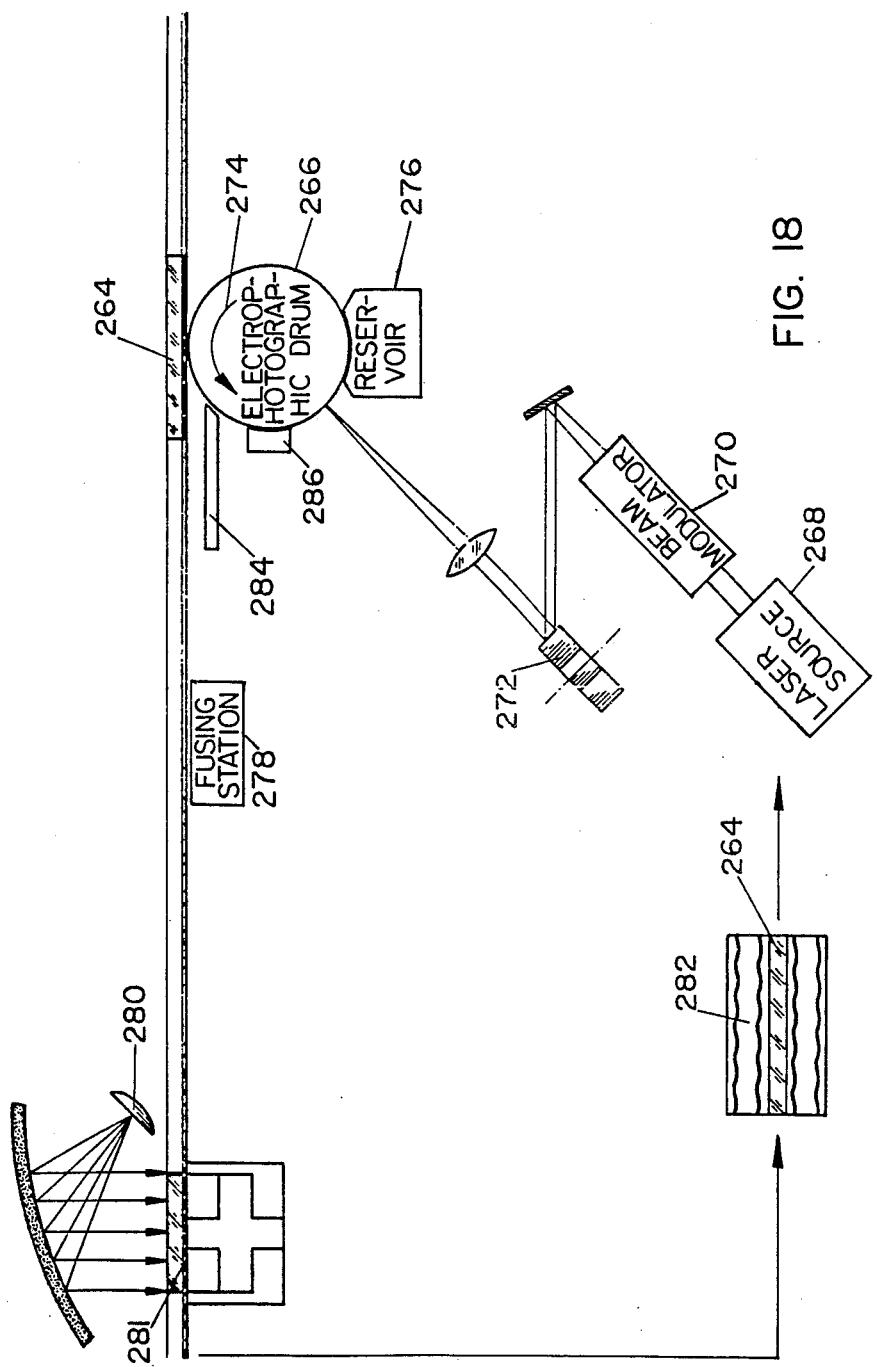
FIG. 18 is a side view pictorial illustration of apparatus for three dimensional modelling in accordance with an alternative embodiment of the present invention.

Reference is now made to FIG. 18, which illustrates an alternative indirect exposure technique which differs from the apparatus and technique illustrated in FIG. 2B in that it eliminates the use of photographic film, which is somewhat expensive and replaces it by an erasable mask.

As seen in FIG. 18, the mask is typically formed on a glass substrate 264 as by an electrophotographic technique. A desired pattern is generated on a charged electrophotographic drum 266 using a laser beam from a laser source 268, passing through a beam modulator 270 and via a scanning device 272, which causes the beam to write line by line on the drum 266.

Rotation of the drum in a direction 274 causes the written surface of the drum 266 to receive toner on the written pattern from a reservoir 276. The toner pattern is then contact transferred onto substrate 264 and is subsequently fused thereon at a conventional fusing station 278. According to an alternative embodiment of the invention, the toner pattern is not directly transferred from the drum to the substrates, but instead one or more intermediate transfer cylinders are employed for this purpose.

The patterned mask is conveyed into contact or near contact printing relationship with the solidifiable layer 281 and flood exposed as by a bright light source, such as a mercury vapor lamp 280.

After exposure, the substrate is rinsed, cleaned and dried at a cleaning station 282 and recycled for reuse.

After transfer of the image to the substrate 264, the drum surface is cleaned by a cleaning blade 284 and is uniformly changed as by a corona discharge device 286 before being written upon one again.

Advantages of the above-described embodiment include the ability to employ flood exposure of the solidifiable layer while maintaining relatively short exposure times without requiring highly sensitive photopolymers or the use of expensive photographic film.

Figure 19:
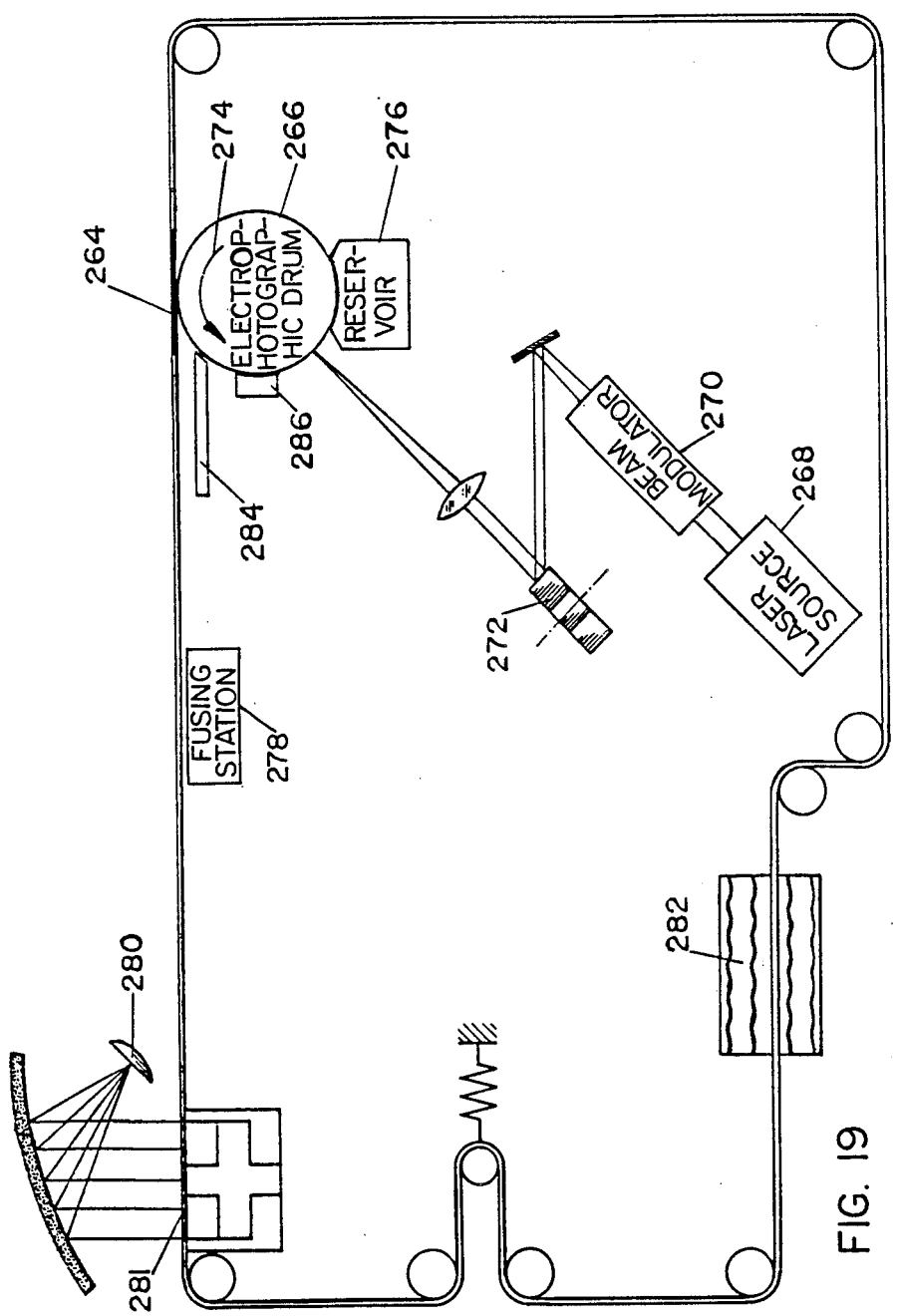
FIG. 19 is a side view pictorial illustration of a variation of the apparatus of FIG. 18.

According to an alternative embodiment of the invention, the apparatus of FIG. 18 may employ a continuous band of mylar or other flexible substrate instead of glass. Such an embodiment is illustrated in FIG. 19, the same reference numerals being employed to designate equivalent elements to those in FIG. 18.

Figure 20:
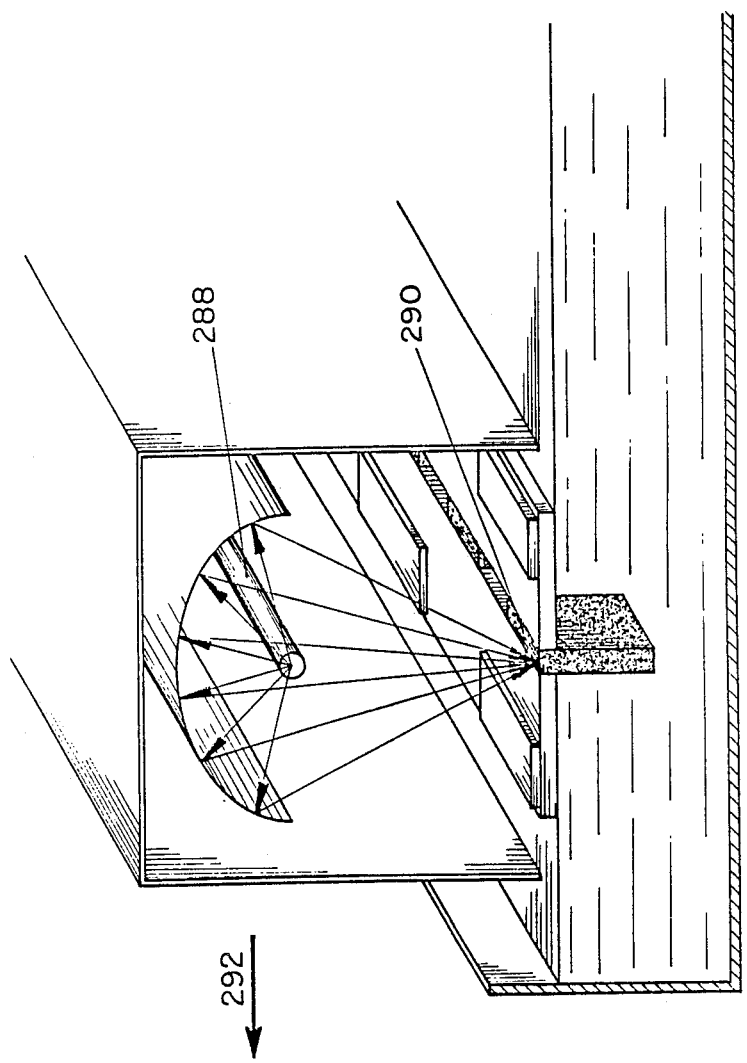
FIG. 20 is a pictorial illustration of apparatus for direct exposure employing an electro-optic shutter, which is useful in a direct exposure modelling device according to the present invention.

Reference is now made to FIG. 20, which illustrates an alternative direct exposure technique suitable for use in the apparatus of FIG. 2A. In the embodiment of FIG. 20, an elongate light source 288 is employed to illuminate a single line of voxels on the solidifiable layer via an electronic line mask 290. The electronic line mask preferably comprises a light switching array of Phillips, Valvo Division. Alternatively, the mask may comprise a liquid crystal array, such as Datashow by Kodak, a PZT electrooptically switched array, or a mechanically operated linear mask.

Both the mask and the light source are translated in a direction 292 across the solidifiable surface, by suitable one dimensional translation apparatus.

A technique employing the apparatus illustrated in FIG. 20 has the advantage that it eliminates mask consumables.

Figure 21:
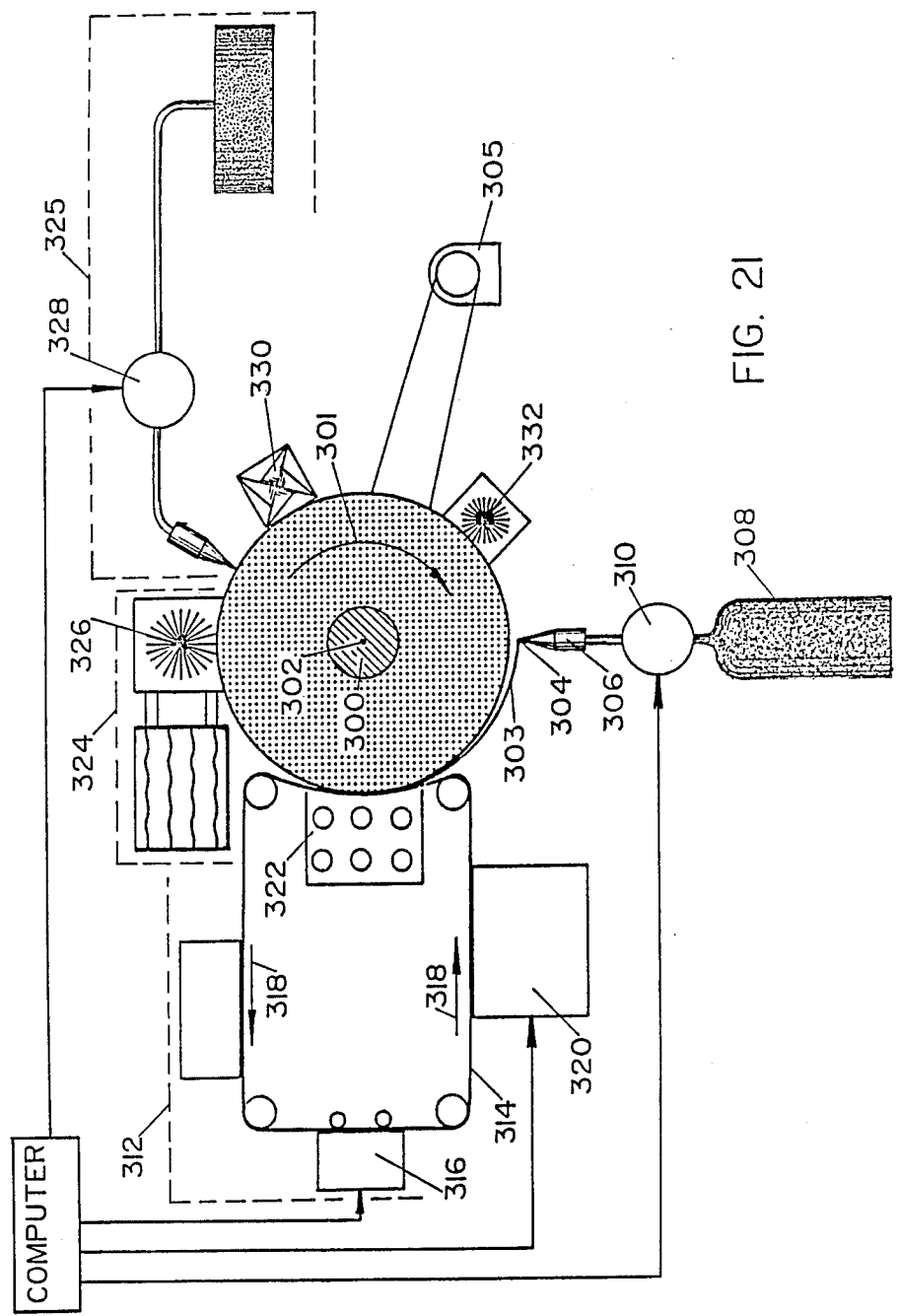
FIG. 21 is a side sectional illustration of apparatus for three dimensional modelling by rolling selectably dimensionable material in a generally cylindrical configuration.

Reference is now made to FIG. 21, which illustrates an alternative embodiment of modelling apparatus constructed and operative in accordance with the present invention.

The apparatus of FIG. 21 is operative to generate a solid object by writing its configuration, layer by layer on the outer layer of a rotating cylinder. A roller 300 is rotated in a rotation direction indicated by arrow 301 by drive means 305 about an axis 302. A layer 303 of a solidifiable material is supplied to the roller 300 along a line 304 parallel to axis 302 by dispensing apparatus 306. The solidifiable material is supplied from a reservoir 308 via a digitally controlled pump 310.

Due to the rotation of roller 300 about axis 302, the layer of solidifiable material is supplied to a writing station, indicated generally by reference numeral 312. Typically the writing station comprises an endless film belt 314, which is driven in rotation so as to have a surface velocity synchronized with that of layer 303.

A film drive mechanism 316, such as a film transport available from MEKEL of Walnut, Calif., drives the film in a direction indicated by arrows 318, past an electrophotographic plotter 320, such as can be found in an HP Laser Printer, which writes an exposure pattern thereon and subsequently past a radiation source 322, which typically comprises a strong UV light source, as is used in contact photographic printing. Source 322 exposes layer 303 through endless film belt 314 which is disposed in contact with layer 303 at that location.

Following exposure, the exposed layer 303 is moved to a fixing station 324 that includes a rinsing facility, typically including a brush 326 and/or a suction pump, which removes the non-hardened portion of layer 303. A finishing station 325 comprises apparatus 328 for filling the space left by removal of the non-hardened portion of layer 303 with a removable material, such as hot wax.

The layer 303 is then cooled as by a fan 330 and smoothed as by a brush 332 and is then ready to receive a further layer 303. All these stations are oriented so that they can move radially so as to stay in touch with the roll as it expands.

Figure 22:
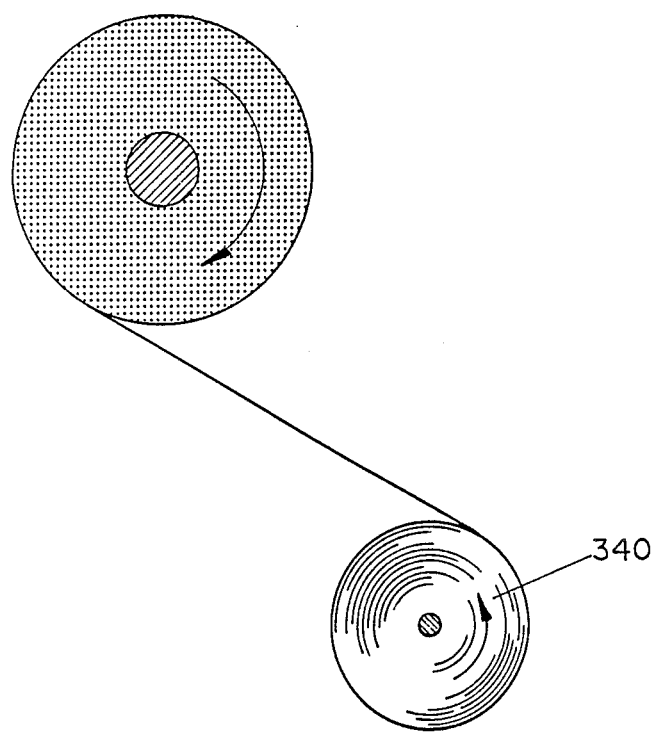
FIG. 22 is an illustration of apparatus for employing photoresist web material useful with part of the apparatus of FIG. 21.

According to an alternative embodiment of the present invention, the layer 303 of a solidifiable material may be replaced by photoresist web material, supplied from a roll 340, as illustrated in FIG. 22.

Dispensing apparatus 306 may employ conventional spreading cylinders as are used in printing apparatus or alternatively may employ a Gardner knife or any other suitable spreading knife. Preferably the layer 303 comprises a relatively high viscosity solidifiable material such as 3100 manufactured by Vitralit (T.M.) of Zurich, Switzerland or Macrobase 600 available from ARCO Chemical Company of the U.S.A.

Figure 23:
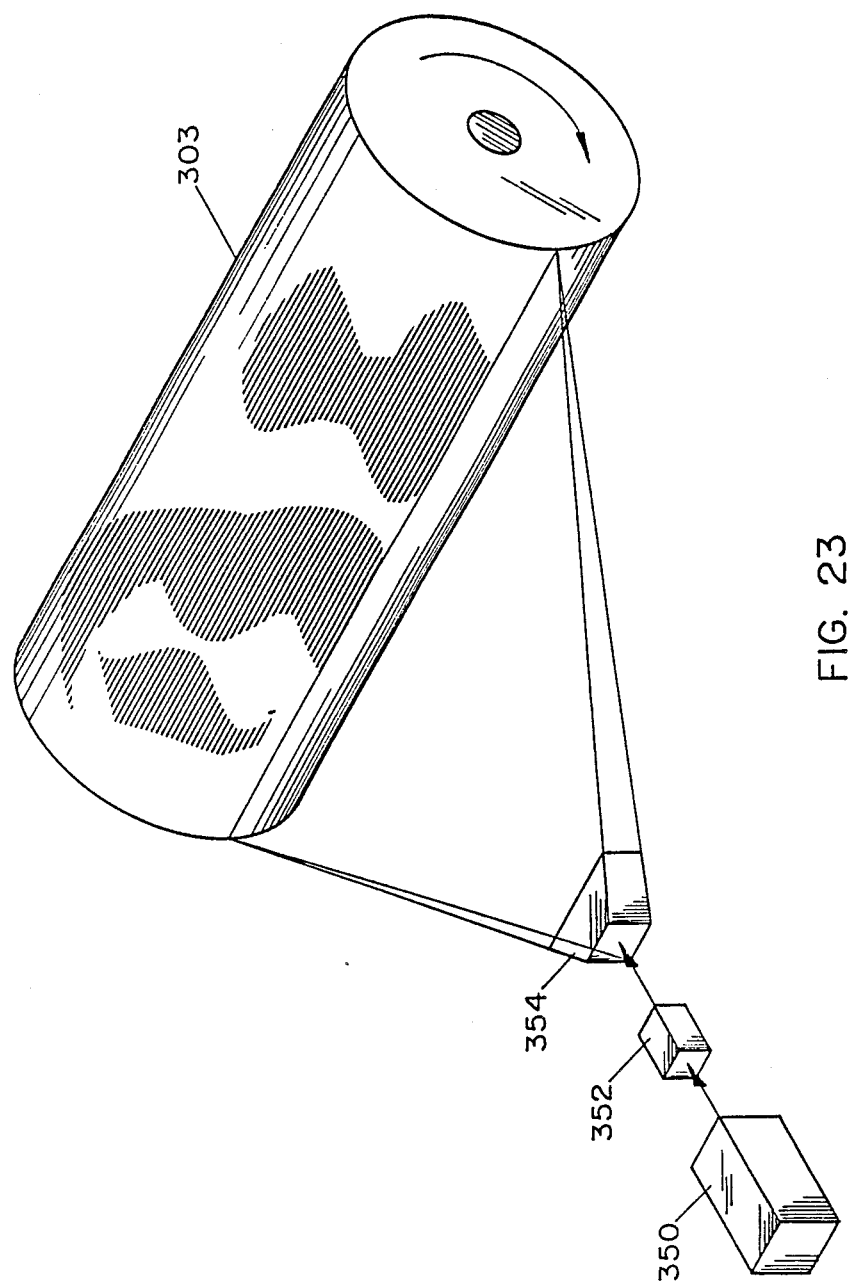
FIG. 23 is an illustration of apparatus for three dimensional modelling similar to that used in FIG. 21 and employing direct laser writing.

According to an alternative embodiment of the invention, writing station 312 may employ direct laser writing on layer 303 using a modulated laser beam. Such an embodiment is illustrated pictorially in FIG. 23. A laser source 350 provides an output beam via a laser modulator 352. The modulated laser beam passes through a beam deflector 354 which writes on layer 303 in a line by line manner. This apparatus is found in the Raystar Laser Plotter of Scitex Corporation of Israel.

Figure 24:
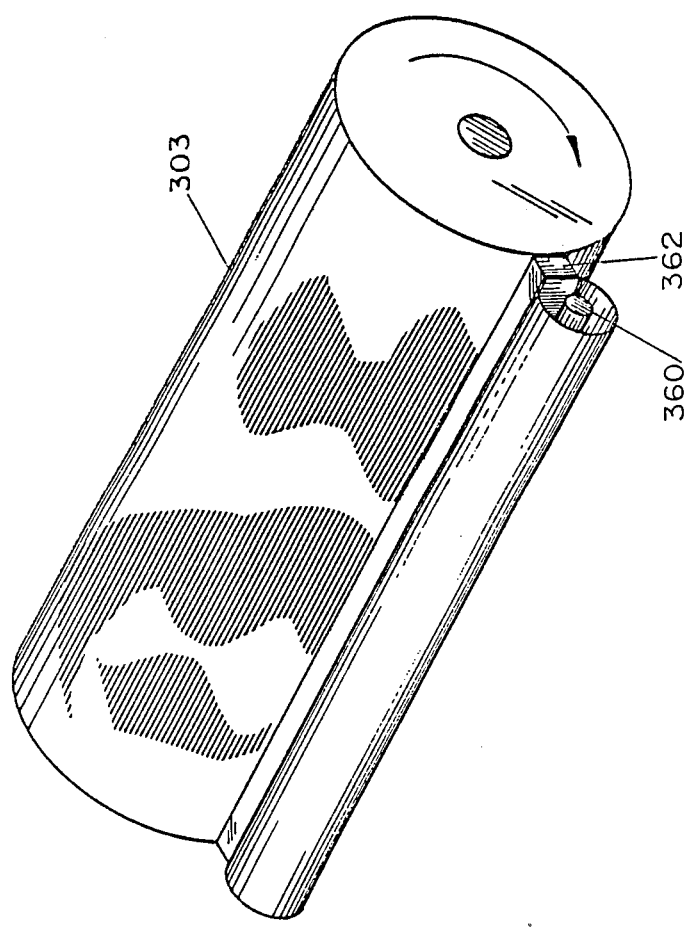
FIG. 24 is an illustration of apparatus for writing with a LISA array, useful with an apparatus of FIG. 21.

According to a further alternative embodiment of the present invention, illustrated in FIG. 24, direct line by line laser writing on layer 303 may be provided through the use of a linear light source 350 such as a Model AUVBA manufactured by American Ultraviolet Co. or Model 6508A431 manufactured by Canrad Hanovia which illuminates the layer 303 via a linear shutter array (LISA) 362, such as a LISA-2500 manufactured by Phillips or a liquid crystal light valve such as a model H-4060 manufactured by Hughes Aircraft Company of Carlsbad, Calif., or an electro-optic ceramic PLZT light gate developed by the Standard Elektrik Research Center of Stuttgart, West Germany.

Figure 25:
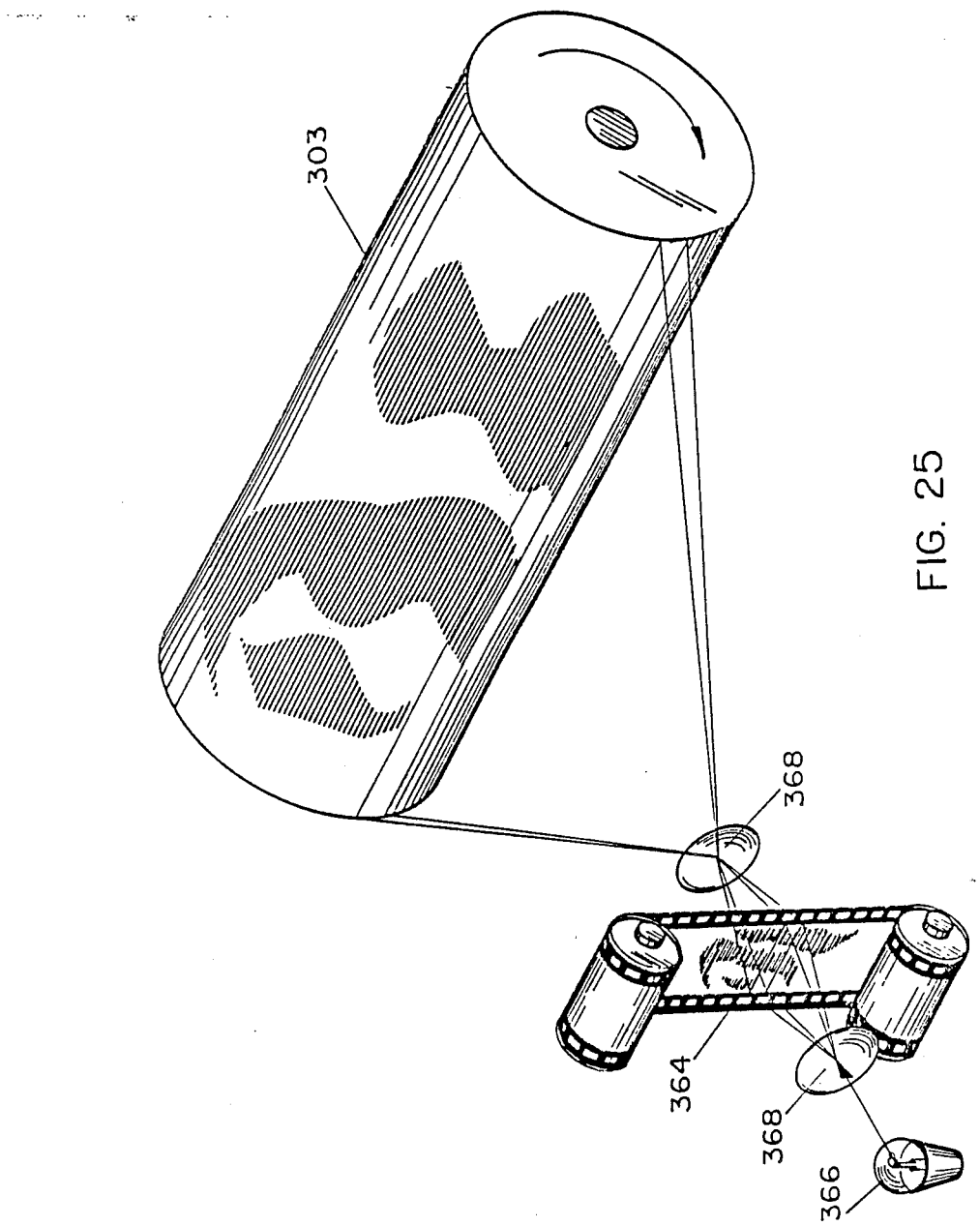
FIG. 25 is an illustration of apparatus for writing with a photographic film strip, useful with the apparatus of FIG. 21.

According to a still further alternative embodiment of the present invention, illustrated in FIG. 25, a pre-prepared film 364 may be employed for non-contact exposure of layer 303 in association with a conventional projection system including a light source 366 and lenses 368.

Regarding the fixing station 324, it is noted that various techniques already described hereinabove may be used for preventing unwanted solidification. These include the use of a dyed blocking layer, chemical neutralization of unpolymerized material and controlling the intensity of the radiation so that it does not cause polymerization beyond a predetermined depth.

It will be appreciated that the technique described hereinabove in connection with FIGS. 21–25 is not limited to a cylindrical configuration but is equally applicable to a rectangular or helical configuration or any other built up solid configuration.

Following completion of the building up steps, the built up cylinder or other solid object is removed from the apparatus of FIG. 21 and is then subjected to treatment to remove the hot wax or other filler material, so that only the polymerized solidifiable material remains.

It is appreciated that various small objects can be combined by suitable nesting techniques already discussed above so that they can be formed together in one building up process. Similarly, a large object may be broken down into components, each of which may be made by the techniques described hereinabove.

It will be appreciated by persons skilled in the art that the present invention is not limited by what has been particularly shown and described hereinabove. Rather the scope of the present invention is defined only by the claims which follow:

We claim:

1. A three dimensional modelling system comprising:

means for providing coordinate information with respect to a three-dimensional element;

workstation means arranged to receive the coordinate information from the providing means and to manipulate the coordinate information; and, means responsive to manipulated coordinate information for automatically providing a three-dimensional model of said three-dimensional element by sequentially irradiating a plurality of layers of a first material which is solidifiable in response to such irradiation and including means for adding to each layer of said first material, subsequent to irradiation thereof, a second material which is not solidifiable in response to such irradiation to serve as a support material, prior to irradiation of a subsequent layer of said first material.

2. Apparatus according to claim 1 and wherein said means for providing a three-dimensional model comprises optical means having optical power for irradiating a layer of a solidifiable liquid via a plotter generated mask.

3. Apparatus according to claim 1 and wherein said means for providing a three-dimensional model comprises means for accurate positioning and registration of a plurality of pattern masks including a closed loop position monitoring system for governing positioning and registration.

4. Apparatus according to claim 1 and wherein said means for providing a three-dimensional model also comprises means for generating pattern masks by electrophotographic techniques.

5. Apparatus according to claim 4 and wherein said means for generating pattern masks comprises means for generating pattern masks by the deposition of toner on a glass plate in a desired pattern.

6. Apparatus according to claim 5 and wherein said means for generating pattern masks by deposition comprises means for exposing a charged electrophotographic drum using a laser beam in a line by line writing mode.

7. Apparatus according to claim 1 and wherein said means for providing a three-dimensional model comprises means for exposing a modelling material through an erasable mask using an electro-optical shutter.

8. Apparatus according to claim 1 and wherein said means for providing a three-dimensional model comprises:
a disposable container containing a solidifiable liquid;
means for irradiating said solidifiable liquid at a solidification plane defined therein; and
means for providing relative displacement between the means for irradiating and the container.

9. Apparatus according to claim 8 and wherein said disposable container and said means for irradiating are arranged such that the solidifiable material is maintained entirely out of contact with the means for irradiating and the means for providing relative displacement.

10. Apparatus according to claim 8 and wherein said means for providing relative displacement comprises means for moving the container and the support base together relative to said means for irradiating which is fixed.

11. Apparatus according to claim 8 and wherein said means for providing relative displacement comprises means for moving the apparatus for irradiating relative to the container and the support base which are fixed.

12. Apparatus according to claim 11 and wherein said means for moving comprises means for moving a source of radiation.

13. Apparatus according to claim 11 and wherein said means for moving comprises means for moving optical elements associated with a radiation source and which define an image plane.

14. Apparatus according to claim 8 and wherein said means for providing relative displacement is operated continuously.

15. Apparatus according to claim 8 and wherein said solidifiable liquid is formulated to have relatively small amounts of shrinkage.

16. Apparatus according to claim 15 and wherein said solidifiable liquid comprises an active monomer which has a given shrinkage coefficient mixed with another monomer which has a given expansion coefficient in order to provide a mixture which has a zero or near zero shrinkage coefficient.

17. Apparatus according to claim 8 and wherein said means for irradiating is operative to provide irradiation for each layer whereby following initial irradiation of the solidifiable liquid, as shrinkage occurs, additional solidifiable liquid moves into place to take up the shrinkage, and further radiation produces solidification of such additional solidifiable liquid.

18. Apparatus according to claim 8 and wherein said means for irradiating comprises means for patterning the radiation of the liquid layer to restrict shrinkage at any given time to localized areas, whereby the shrinkage can be made up during solidification of adjacent areas.

19. Apparatus according to claim 8 and wherein said solidifiable liquid includes radiation transparent particles in order to reduce the effective volume of curing material for a given volume of solidifiable liquid and therefore to reduce the energy needed to solidify that given volume and reduce the shrinkage.

20. Apparatus according to claim 1 and also comprising means for pre-processing of predetermined geometries in said three-dimensional element in order to enable them to be successfully modelled and means for supplying modified modelling instructions to said means responsive to manipulated coordinate information for automatically providing a three-dimensional model.

21. Apparatus according to claim 1 and also comprising means for defining a stable layer of a solidifiable liquid in a desired plane.

22. Apparatus according to claim 21 and wherein said means for defining comprises means for defining a volume of non-solidifiable support material and means for defining a layer of solidifiable liquid over the layer of solid support material.

23. Apparatus according to claim 1 and also comprising means for limiting the depth of solidification of solidifiable liquid by chemical inhibition.

24. For use in a three dimensional modelling system including means for providing coordinate information with respect to a three-dimensional element and workstation means arranged to receive the coordinate information from the providing means and to permit manipulation of the coordinate information:

means responsive to manipulated coordinate information for automatically providing a three-dimensional model of said three-dimensional element by sequentially irradiating a plurality of layers of a first material which is solidifiable in response to such irradiation and including means for adding to each layer of said first material, subsequent to irradiation thereof, a second material which is not solidifiable in response to such irradiation to serve as a support material, prior to irradiation of a subsequent layer of said first material.

25. A system responsive to coordinate information with respect to a three-dimensional element for automatically providing a three-dimensional model of said three-dimensional element comprising:

means for sequentially irradiating a plurality of layers of a first material which is solidifiable in response to such irradiation in accordance with said information; and means for adding to each layer of said first material, subsequent to irradiation thereof, a second solidifiable material, which is not solidifiable in response to such irradiation, to serve as a support material, prior to irradiation of a subsequent layer of said first material.

* * * * *